United States Patent
Fukuhara et al.

(10) Patent No.: US 8,406,533 B2
(45) Date of Patent: Mar. 26, 2013

(54) IMAGE COMPARING APPARATUS AND METHOD THEREFOR, IMAGE RETRIEVING APPARATUS AS WELL AS PROGRAM AND RECORDING MEDIUM

(75) Inventors: Takahiro Fukuhara, Kanagawa (JP); Hitoshi Kiya, Tokyo (JP)

(73) Assignees: Sony Corporation, Tokyo (JP); Kiya Hitoshi, Tokyo (JP)

( * ) Notice: Subject to any disclaimer, the term of this patent is extended or adjusted under 35 U.S.C. 154(b) by 667 days.

(21) Appl. No.: 12/616,280

(22) Filed: Nov. 11, 2009

(65) Prior Publication Data

US 2010/0202705 A1 Aug. 12, 2010

(30) Foreign Application Priority Data

Feb. 9, 2009 (JP) .................................. 2009-027381

(51) Int. Cl.
*G06K 9/68* (2006.01)
(52) U.S. Cl. ....................................................... 382/218
(58) Field of Classification Search ........................ None
See application file for complete search history.

(56) References Cited

U.S. PATENT DOCUMENTS

2004/0098225 A1 5/2004 Abe et al.
2006/0222249 A1 10/2006 Hosaka et al.

FOREIGN PATENT DOCUMENTS

JP 2004 45565 2/2004
JP 2006 285615 10/2006

*Primary Examiner* — Nirav G Patel
(74) *Attorney, Agent, or Firm* — Frommer Lawrence & Haug LLP; William S. Frommer; Ellen Marcie Emas

(57) ABSTRACT

A coding parameter extracting unit extracts and supplies coding parameters of a code stream to an image characteristic amount output unit. A code stream characteristic amount extracting unit outputs a first vector calculated based on the number of zero bit planes for each code block extracted by analyzing the code stream. The image characteristic amount output unit uses the coding parameters other than a quantization step size of the code stream to output a second vector calculated based on the number of zero bit planes for each code block of a specific image. A comparing unit compares the first and second vectors for each code block and makes a matching decision between the code stream and the specific image.

12 Claims, 17 Drawing Sheets

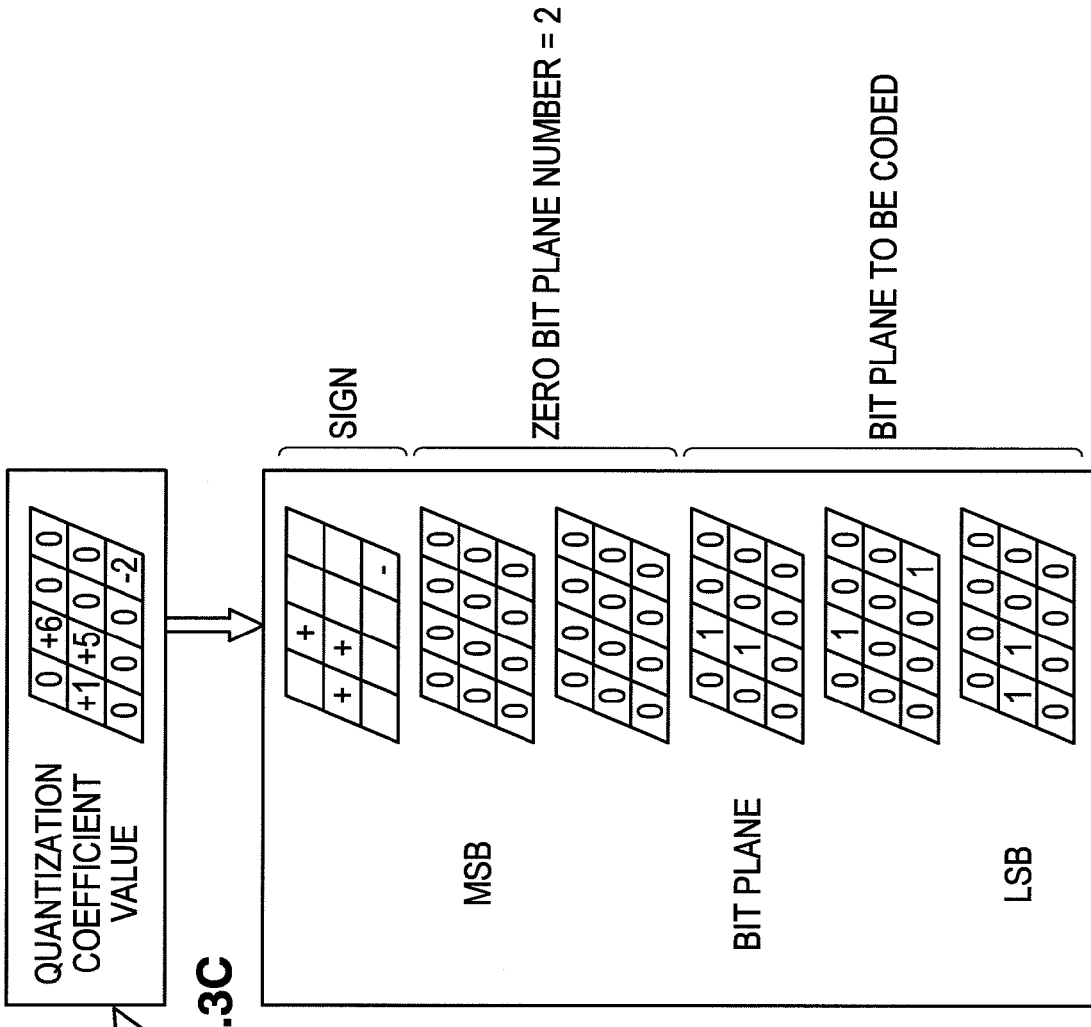
FIG.3B
FIG.3C
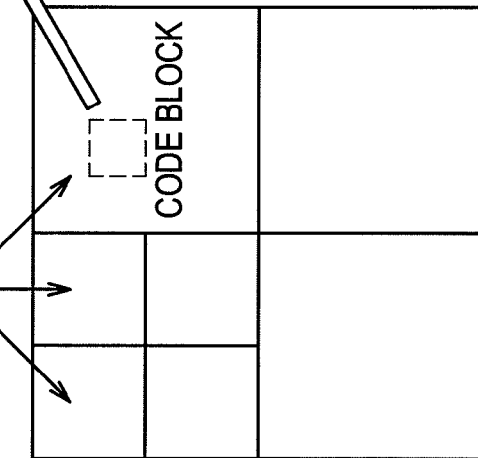
FIG.3A

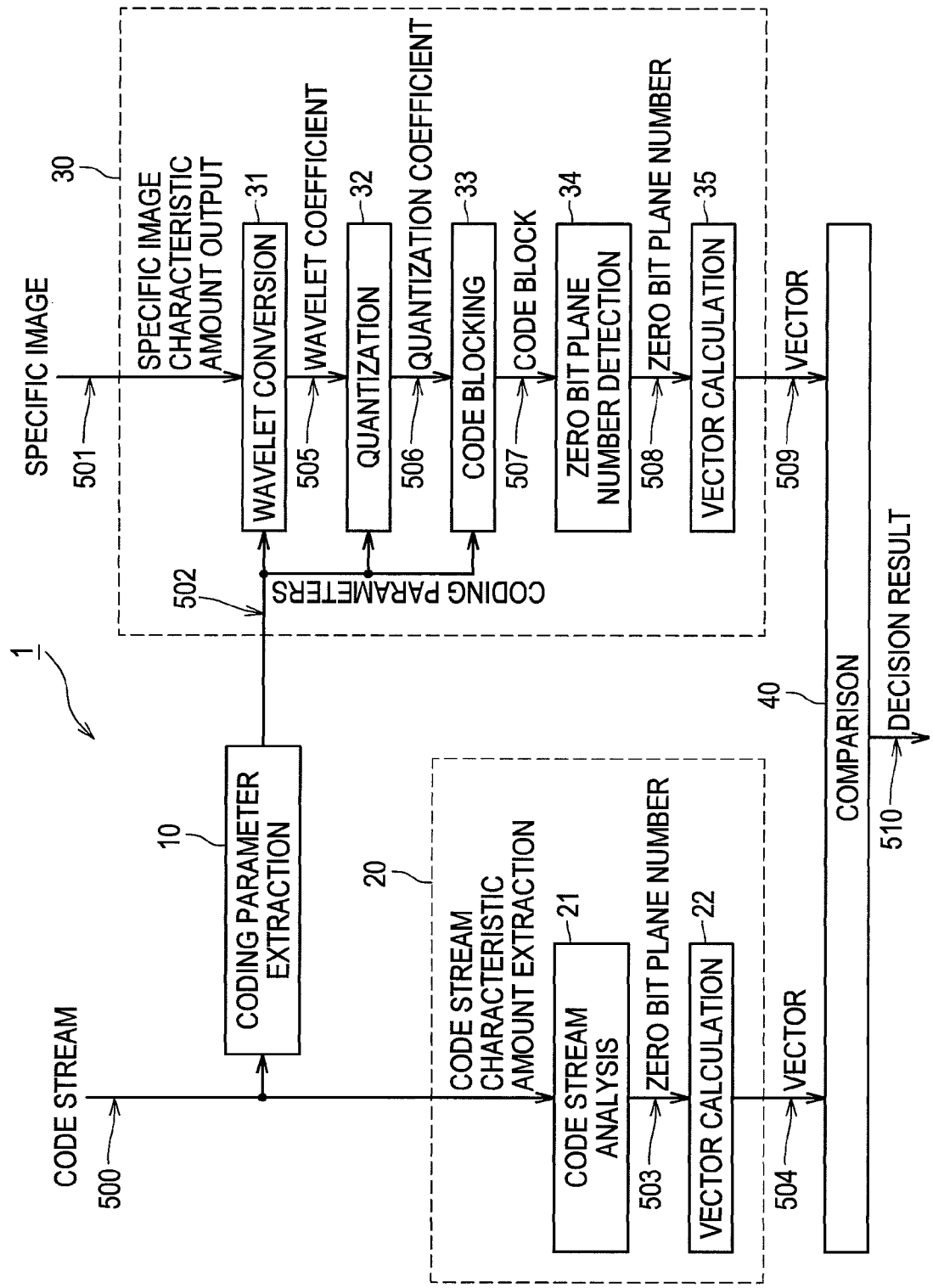

Case-1

Case-2

Case-3

IMAGE COMPARING APPARATUS AND METHOD THEREFOR, IMAGE RETRIEVING APPARATUS AS WELL AS PROGRAM AND RECORDING MEDIUM

BACKGROUND OF THE INVENTION

1. Field of the Invention

The present invention relates to an image comparing apparatus and a method therefor, an image retrieving apparatus, as well as a program and a recording medium. More specifically, the present invention relates to an image comparing apparatus and method for comparing an image compressed and coded according to JPEG (Joint Photographic Experts Group) 2000 system or the like with a specific image to make a matching decision or similarity decision. Further, the present invention relates to an image retrieving apparatus and method, program and recording medium for retrieving an image substantially matching with a specific image from among video contents compressed and coded according to JPEG 2000 system or the like.

2. Description of the Related Art

In related art, there has been required a technique for retrieving an image substantially matching with a specific image from among unknown video contents with the specific image as search query in order to retrieve video contents, for example. In Japanese Patent Application Laid-Open No. 2004-45565 described below, there is proposed a technique for extracting the characteristic amount for each short time frame from video contents to configure a characteristic vector, and comparing the characteristic vector with a characteristic vector of a specific image, thereby retrieving an image substantially matching with the specific image from the video contents.

In recent years, in many cases, an image has been directly photographed in digital to be subjected to image compression for recording along with widely use of products such as digital cameras or digital camcorders. Further, a television program is digitalized to be subjected to image compression, and is saved as archives. It was decided in 2004 that JPEG 2000 system is adopted as image compression method in standardizing digital cinemas, so that many movie films have been digitalized and been compressed and coded according to JPEG 2000 system for use.

There would be an increasing need to retrieve an image substantially matching with a specific image from among many images compressed and coded according to JEPG 2000 system. There is assumed an increasing need to retrieve an image substantially matching with a specific image from among video contents compressed and coded according to JPEG 2000 system. However, in the related art as in Japanese Patent Application Laid-Open No. 2004-45565, there was an issue that since the images or video contents need to be completely decoded prior to retrieval, the amount of calculation increases for the entire processing.

Thus, in Japanese Patent Application Laid-Open No. 2006-285615 described later, there is disclosed an image comparing apparatus and method for making a matching decision or similarity decision with a specific image without completely decoding an image compressed and coded according to JEPG 2000 system or the like. Further, there are disclosed an image retrieving apparatus and method, as well as program and recording medium for retrieving an image substantially matching with a specific image without completely decoding video contents compressed and coded according to JPEG 2000 system or the like.

The technique described in Japanese Patent Application Laid-Open No. 2006-285615 includes a first characteristic amount extracting means for extracting the number of zero bit planes for each code block from a JPEG 2000 code stream, a coding parameter extracting means for extracting coding parameters from the code stream, a second characteristic amount extracting means for performing wavelet conversion and quantization on a specific image based on the coding parameters, and then dividing a quantization coefficient into code blocks to extract the number of zero bit planes for each code block, and a comparing means for comparing the number of zero bit planes for each code block of the code stream with the number of zero bit planes for each code block of the specific image between the code blocks at the same position to decide whether the code stream substantially matches with the specific image depending on a comparison result.

SUMMARY OF THE INVENTION

According to the technique described in Japanese Patent Application Laid-Open No. 2006-285615, it is advantageous that a code streams and a specific image can be compared with each other without completely decoding video contents compressed and coded according to JPEG 2000 system or the like. On the contrary, there is a need that coding parameters are extracted from the code stream and the specific image is compressed and coded based on the parameters. Thus, since when a quantization step size is different therebetween, the numbers of zero bit planes are different so that a comparison is not possible, which is desired to improve.

In light of the foregoing, it is desirable to provide an image comparing apparatus and a method capable of making a comparison with high accuracy without completely decoding a code stream, and making a matching decision or similarity decision even when a quantization step size is different between the code stream compressed and coded according to JPEG 2000 system and a specific image, an image retrieving apparatus for retrieving an image substantially matching with a specific image, as well as a program and a recording medium.

According to an embodiment of the present invention, there is provided an image comparing apparatus for comparing a code stream obtained by coding an image with a specific image to decide whether to match, including a vector calculating unit for calculating a first vector indicative of a correlation between the number of zero bit planes of a code block of interest to be processed and the number of zero bit planes of a code block near the code block of interest based on the number of zero bit planes of the code stream, a vector output unit for outputting a second vector indicative of a correlation between the number of zero bit planes of a code block of interest in the specific image and the number of zero bit planes of a code block near the code block of interest, and a comparing unit for sequentially comparing a first vector from the vector calculating unit with a second vector from the vector output unit for code blocks of interest at the same position of the code stream and the specific image and deciding whether the code stream matches with the specific image depending on a comparison result.

The vector output unit preferably output the second vector calculated based on the number of zero bit planes for each code block obtained when coding the specific image using coding parameters not containing a quantization step size among the coding parameters used when coding the code stream.

The first and second vectors can be defined as a difference between the number of zero bit planes of the code block of interest and the number of zero bit planes of one or more code blocks within eight surrounding code blocks adjacent to the code block of interest.

The comparing unit compares a first vector of a code block of interest from the vector calculating unit with a second vector of a code block at the same position as the code block of interest from the vector output unit, and when the number of matched code blocks is equal to or more than a preset threshold, decides that the code stream matches with the specific image. The comparing unit in this case decides that the code stream matches with the specific image when the first vector matches with the second vector for all the code blocks within each image in the code stream and the specific image. Alternatively, the comparing unit compares the first vector with the second vector only for part of components or part of subbands in the code stream and the specific image.

The image comparing apparatus includes a code stream analyzing unit for analyzing the code stream and thereby extracting the number of zero bit planes for each code block from the code stream, and the vector calculating unit calculates the first vector based on the number of zero bit planes extracted by the code stream analyzing unit.

The image comparing apparatus includes a coding parameter extracting unit for extracting coding parameters from the code stream, and the vector output unit may be configured to have a second vector calculating unit for calculating the second vector based on the number of zero bit planes for each code block obtained when coding the specific image using coding parameters not containing a quantization step size among the coding parameters extracted by the code stream extracting unit.

For example, the code stream is obtained by compressing and coding the image according to JPEG 2000 system, the coding parameters contain wavelet converting filter information, wavelet conversion's decomposition level number, quantization step size, code block size, guard bit information and target compression rate, and the vector output unit outputs the second vector calculated based on the number of zero bit planes for each code block obtained when coding the specific image according to JPEG 2000 system using coding parameters not containing a quantization step size among the coding parameters used when coding the code stream.

The image comparing apparatus with the above configuration makes a matching decision (identification) of the code stream and the specific image with a vector (or vector value) indicative of a correlation (such as difference) between the number of zero bit planes of a code block of interest at the same position to be processed and the number of zero bit planes of one or more code blocks neighboring (for example, adjacent) thereto as the characteristic amount. This is because even when the quantization step size is different, a correlation between the numbers of zero bit planes of quantization coefficients to be generated, that is a difference relationship does not change, so that the vector indicative of the difference between the numbers of zero bit planes is assumed as the characteristic amount, thereby making a highly accurate comparison without being influenced by the quantization step size.

According to another embodiment of the present invention, there is provided an image comparing method for comparing a code streams obtained by coding an image with a specific image to decide whether to match, including the steps of analyzing the code stream and thereby extracting the number of zero bit planes for each code block from the code stream, calculating a first vector indicative of an correlation between the number of zero bit planes of a code block of interest to be processed and the number of zero bit planes of a code block near the code block of interest based on the number of zero bit planes extracted in the code stream analyzing step, outputting a second vector indicative of a correlation between the number of zero bit planes of a code block of interest and the number of zero bit planes of a code block near the code block of interest for the specific image, and sequentially comparing a first vector from the vector calculating step with a second vector from the vector outputting step for code blocks of interest at the same position of the code stream and the specific image and deciding whether the code stream matches with the specific image depending on a comparison result.

According to another embodiment of the present invention, there is provided an image retrieving apparatus for comparing a code stream string obtained by coding multiple images with a specific image to retrieve a code stream of a matched image, including a code stream analyzing unit for sequentially analyzing the code stream in the code stream string and thereby extracting the number of zero bit planes for each code block from the code stream, a vector calculating unit for calculating a first vector indicative of a correlation between the number of zero bit planes of a code block of interest to be processed and the number of zero bit planes of a code block near the code block of interest based on the number of zero bit planes extracted in the code stream analyzing unit, a vector output unit for outputting a second vector indicative of a correlation between the number of zero bit planes of a code block of interest and the number of zero bit planes of a code block near the code block of interest for the specific image, a comparing unit for sequentially comparing a first vector from the vector calculating unit with a second vector from the vector output unit for code blocks of interest at the same position of the code stream and the specific image and deciding whether the code stream matches with the specific image depending on a comparison result, and a selecting unit for selecting the code stream decided to be matched by the comparing unit within the code stream string.

According to another embodiment of the present invention, there is provided an image comparing apparatus for comparing a code stream obtained by coding an image with a specific image to output a similarity, including a code stream analyzing unit for analyzing the code stream and thereby extracting the number of zero bit planes for each code block from the code stream, a vector calculating unit for calculating a first vector indicative of a correlation between the number of zero bit planes of a code block of interest to be processed and the number of zero bit planes of a code block near the code block of interest based on the number of zero bit planes extracted by the code stream analyzing unit, a vector output unit for outputting a second vector indicative of a correlation between the number of zero bit planes of a code block of interest and the number of zero bit planes of a code block near the code block of interest for the specific image, a comparing unit for sequentially comparing a first vector from the vector calculating unit with a second vector from the vector output unit for code blocks of interest at the same position of the code stream and the specific image and outputting a comparison result, and an accumulating unit for accumulating comparison results from the comparing unit and outputting a similarity between the code stream and the specific image.

According to another embodiment of the present invention, there is provided an image comparing apparatus for comparing a code stream obtained by coding an image with a specific image to decide whether to match, including a vector calculating means for calculating a first vector indicative of a correlation between the number of zero bit planes of a code block of interest to be processed and the number of zero bit planes of a code block near the code block of interest based on the number of zero bit planes of the code stream, a vector output means for outputting a second vector indicative of a correlation between the number of zero bit planes of a code block of interest in the specific image and the number of zero bit planes of a code block near the code block of interest, and a comparing means for sequentially comparing a first vector from the vector calculating unit with a second vector from the vector output unit for code blocks of interest at the same position of the code stream and the specific image and deciding whether the code stream matches with the specific image depending on a comparison result.

The program according to an embodiment of the present invention is directed for causing a computer to perform the above image comparison processing and image retrieval processing, and the recording medium according to an embodiment of the present invention stores therein such programs and is computer-readable.

According to the present invention, when the code stream is compared with the specific image, even if a quantization step size is different therebetween and the number of zero bit planes is different therebetween, a comparison is made with a vector indicative of a correlation between the number of zero bit planes of a code block of interest and the number of zero bit planes of one or more code blocks adjacent thereto as the characteristic amount so that the code stream and the specific image can be compared with high accuracy and a matching decision or similarity decision can be made without completely decoding the code stream.

BRIEF DESCRIPTION OF THE DRAWINGS

FIGS. 3A to 3C are diagrams showing a relationship between a code block and bit planes;

FIG. 8 is a block diagram showing a schematic configuration of an image comparing apparatus according to a first embodiment of the present invention;

DETAILED DESCRIPTION OF THE EMBODIMENTS

Figure 1:
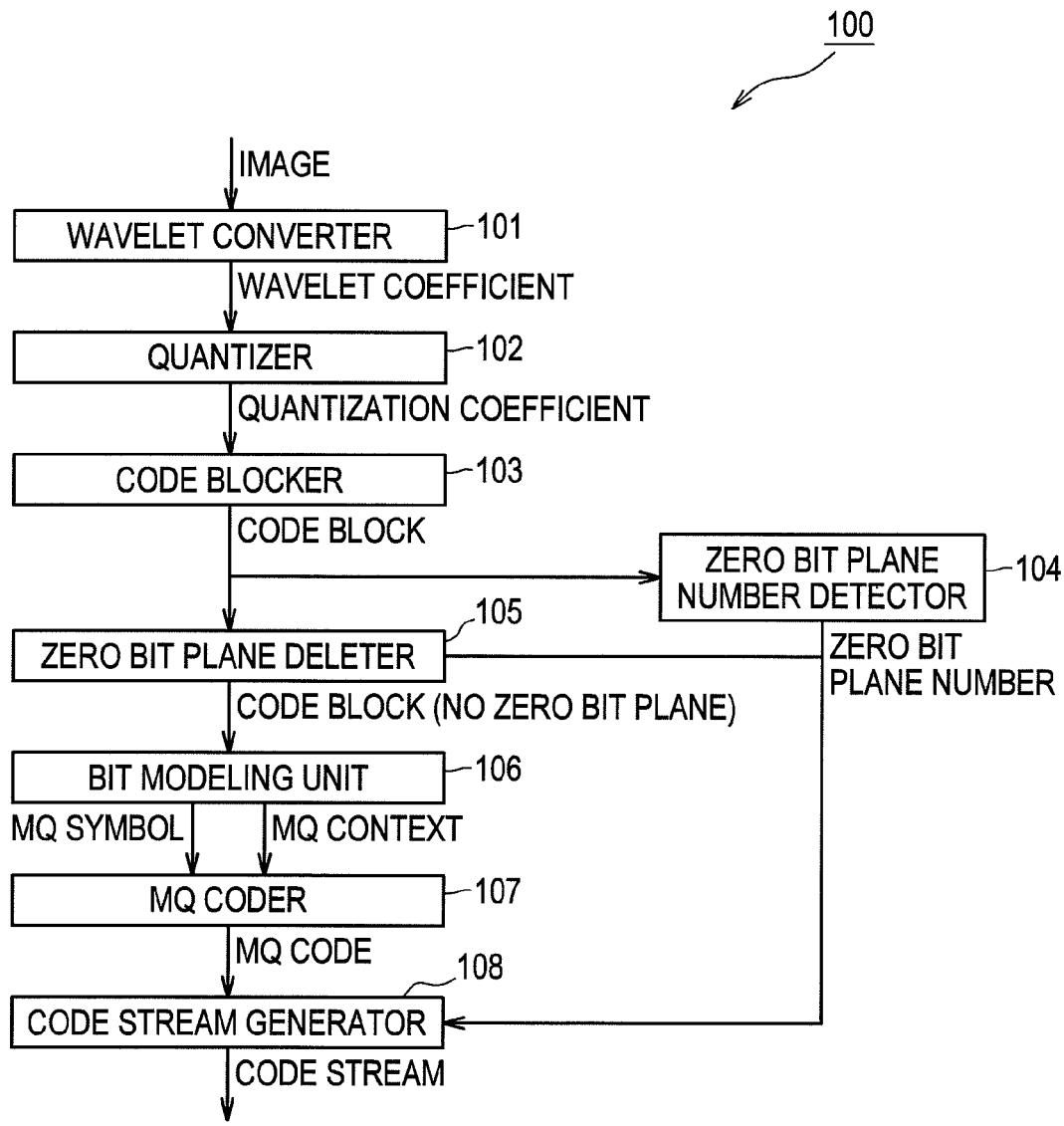
FIG. 1 is a block diagram showing a schematic configuration of an image coding apparatus for coding an image according to JPEG 2000 system and generating a code stream.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

Specific embodiments to which the present invention is applied will be described below in detail with reference to the drawings. The explanation will be made in the following order.

1. JPEG 2000 system (FIGS. 1 to 4)
2. Image comparing apparatus described in Japanese Patent Application Laid-Open No. 2006-285615 (FIGS. 5 to 7)
3. First embodiment (FIGS. 8 to 13)
4. Second embodiment (FIG. 14)
5. Third embodiment (FIG. 15)
6. Fourth embodiment (FIGS. 16 and 17)
7. Experimental examples of embodiments (simulation examples)
8. Fifth embodiment (FIGS. 18 and 19)
9. Other configuration examples 1. JPEG 2000 System

[Coding System Applicable to the Present Invention]

The embodiments described below are embodied such that the present invention is applied to an image comparing apparatus and method for comparing an uncoded image of a code stream compressed and coded according to JPEG 2000 system with a specific image to make a matching decision or similarity decision. Further, the present invention is applied to an image retrieving apparatus and method for retrieving an image substantially matching with a specific image from video contents compressed and coded according to JPEG 2000 system or code streams' database.

The image coding apparatus for coding an image according to JPEG 2000 system and generating a code stream will be described with reference to FIG. 1 prior to explaining specific embodiments of the present invention. The image decoding apparatus for decoding the coded code stream according to JPEG 2000 system and generating a decoded image will be described with reference to the drawings.

[Schematic Configuration of Image Coding Apparatus in JPEG 2000 System]

At first, a schematic configuration of the image coding apparatus for coding an image according to JPEG 2000 system and generating a code stream will be shown in the block diagram of FIG. 1.

Figure 2:
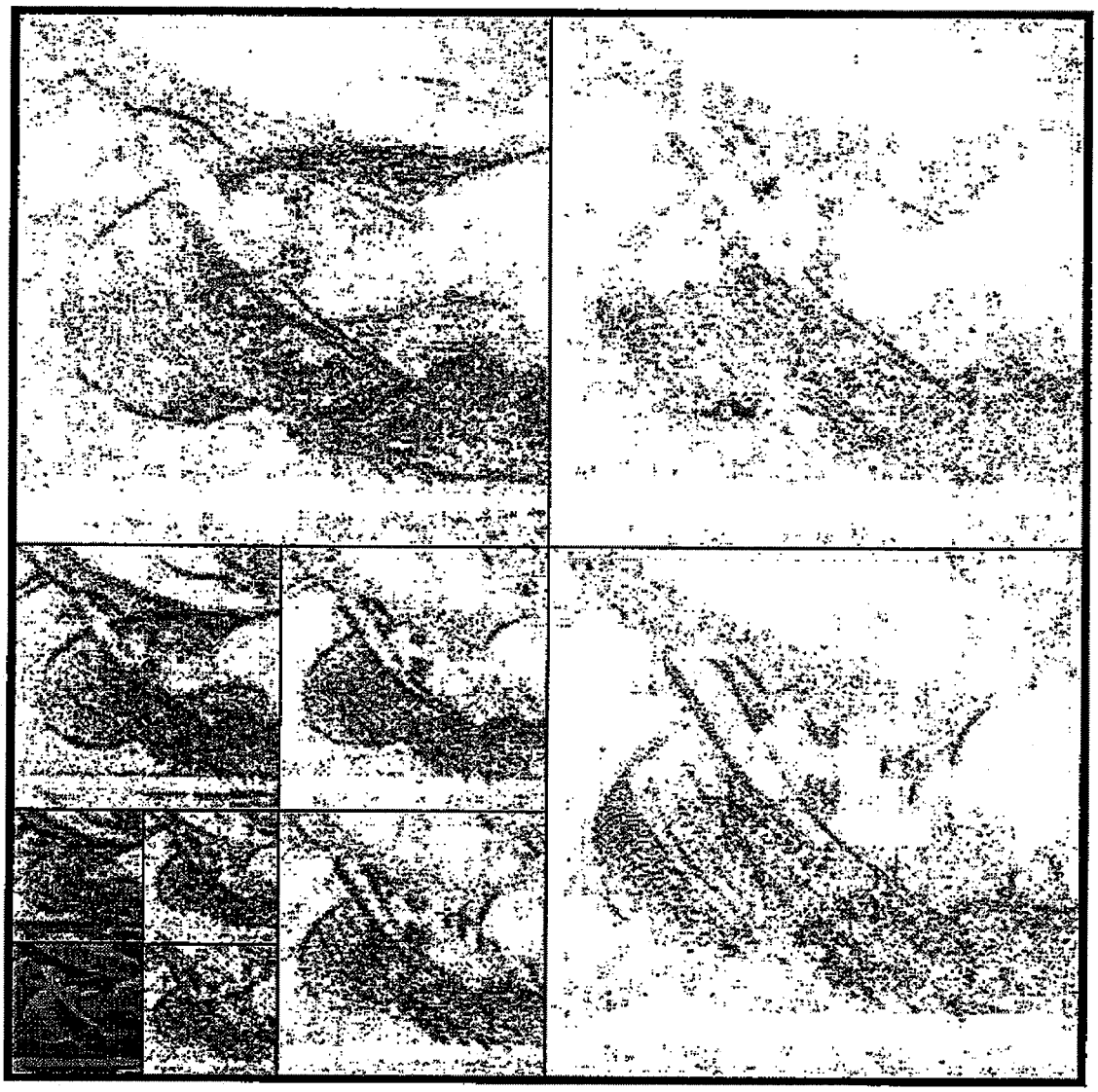
FIG. 2 is a diagram showing one example of a subband after being subjected to a wavelet conversion processing in JPEG 2000 system.

In the image coding apparatus 100 shown in FIG. 1, a wavelet converter 101 performs wavelet conversion on an input image to generate a wavelet coefficient for each subband. The wavelet conversion in JPEG 2000 system is Mallat division which performs a filtering processing with a 2D filter and recursively performs a filtering processing on a low-pass subband. In the example of FIG. 2, a total of ten subbands are formed through the wavelet conversion three times.

A quantizer 102 quantizes a wavelet coefficient for each subband and generates a quantization coefficient. A code blocker 103 divides the quantization coefficient for each subband into code blocks having the same rectangular area, and develops the quantization coefficient for each code block into bit planes as a set of binary (0 or 1) coefficient bits.

FIGS. 3A to 3C show one example of a relationship between subband, code block and bit plane generated after the wavelet conversion. The quantization coefficient for each subband formed as shown in FIG. 3A is divided into code blocks having the same rectangular area. The code block size is typically 64×64 or 32×32, but in the example of FIG. 3B, a code block having a size of 4×3 or made of a total of 12 quantization coefficients is assumed for convenient explanation. The code block shown in FIG. 3B is developed into the bit planes of sign and the bit planes of absolute value as shown in FIG. 3C. A bit plane number detector 104 detects the number of zero bit planes for each code block. The number of zero bit planes represents how many bit planes all the coefficient bit values of which are 0 are at the most significant bit (MSB) side. For example, in the case of FIG. 3C, the number of zero bit planes is 2. Then, a zero bit plane deleter 105 deletes zero bit planes from the code block.

A bit modeling unit 106 performs bit modeling on a code block not containing a zero bit plane, and generates a pair of MQ symbol and MQ context. A MQ coder 107 MQ-codes the pair of MQ symbol and MQ context and generates a MQ code. Finally, a code stream generator 108 generates and outputs a code stream from the MQ code and the number of zero bit planes.

[Schematic Configuration of Image Decoding Apparatus in JPEG 2000 System]

Figure 4:
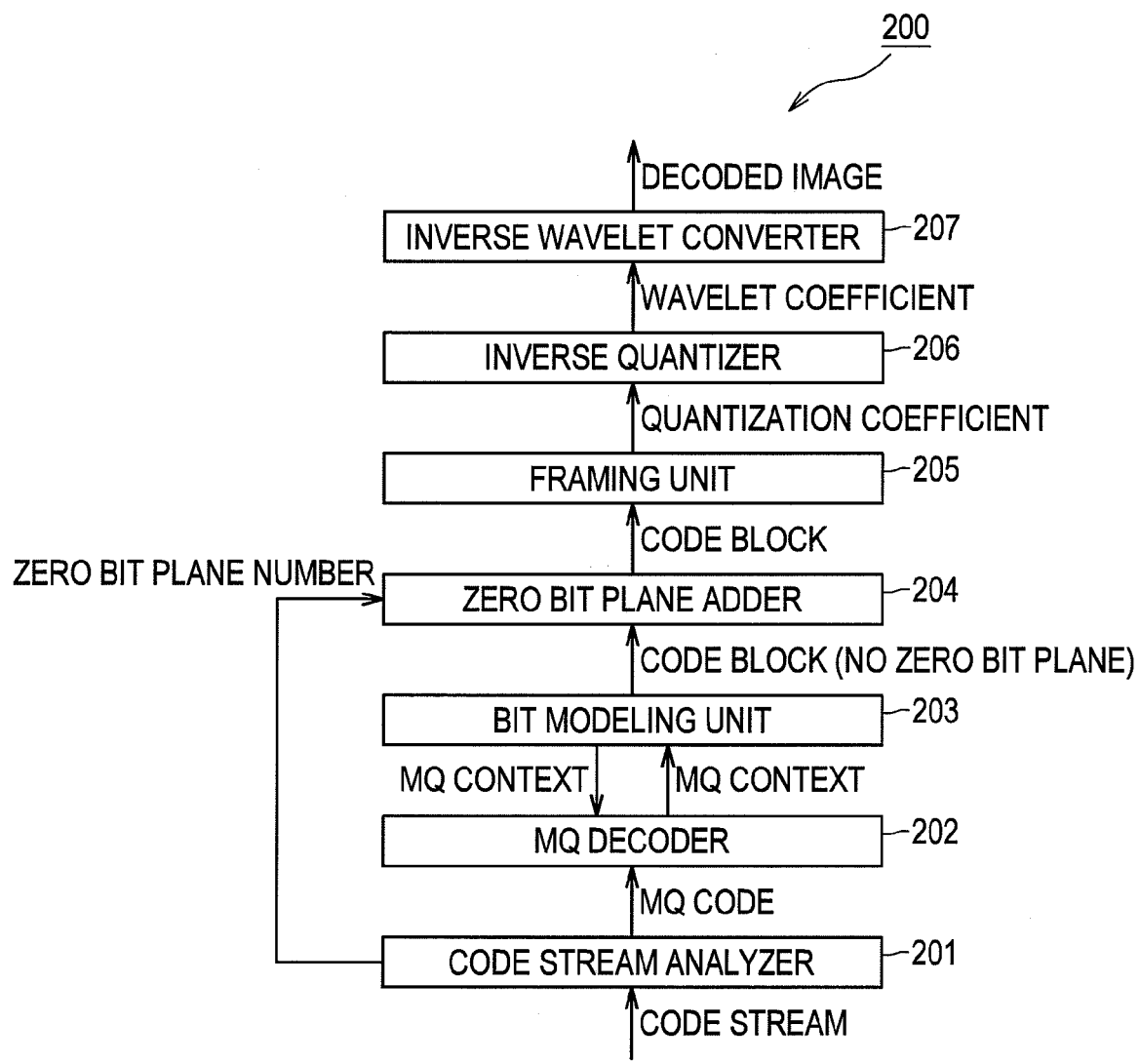
FIG. 4 is a block diagram showing a schematic configuration of an image decoding apparatus for decoding a code stream according to JPEG 2000 system and generating a decoded image.

Next, a schematic configuration of an image decoding apparatus for decoding the code stream according to JPEG 2000 system and generating a decoded image will be shown in the block diagram of FIG. 4.

In the image decoding apparatus 200 shown in FIG. 4, a code stream analyzer 201 analyzes an input code stream and extracts a MQ code and the number of zero bit planes. A MQ decoder 202 uses a MQ context given by a bit modeling unit 203 to decode the MQ code and to generate a MQ symbol.

The bit modeling unit 203 configures a code block not containing a zero bit plane based on the MQ symbol, and a zero bit plane adder 204 adds a zero bit plane to the code block not containing a zero bit plane. A framing unit 205 puts the code blocks containing a zero bit plane for each subband and generates a quantization coefficient for each subband. An inverse quantizer 206 inversely quantizes the quantization coefficient for each subband from the framing unit 205 and generates a wavelet coefficient for each subband. Finally, an inverse wavelet converter 207 performs inverse wavelet conversion on the wavelet coefficient for each subband and generates a decoded image.

<Image Comparing Apparatus Described in Japanese Patent Application Laid-Open No. 2006-285615>

[Schematic Configuration and Operations of Image Comparing Apparatus]

Figure 5:
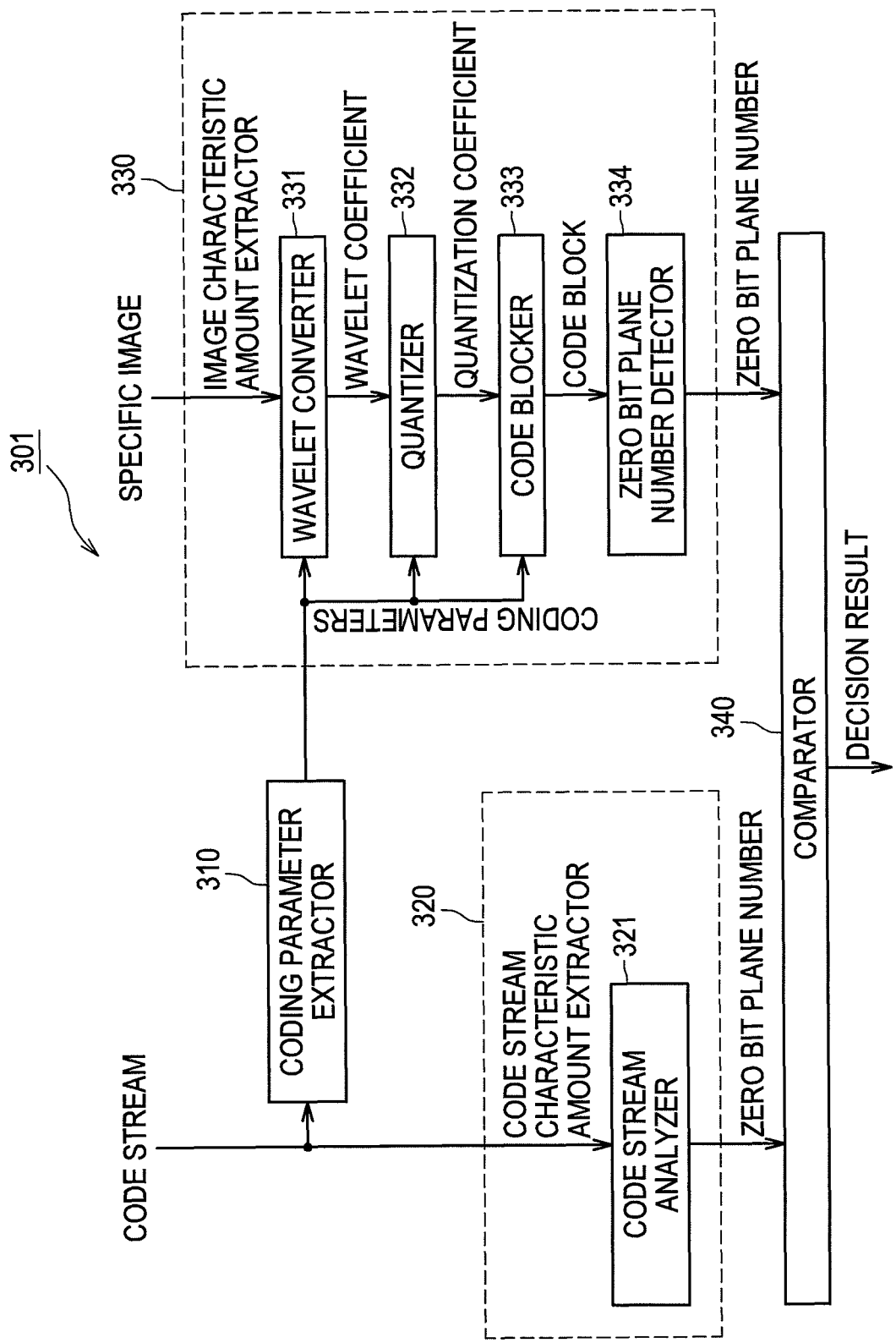
FIG. 5 is a block diagram showing a schematic configuration of an image comparing apparatus described in Japanese Patent Application Laid-Open No. 2006-285615.

A schematic configuration of the image comparing apparatus described in Japanese Patent Application Laid-Open No. 2006-285615 is shown in FIG. 5. The image comparing apparatus 301 compares a code stream input from one terminal, which is coded and generated according to JPEG 2000 system, with a specific image input from the other terminal, and makes a matching decision.

In the image comparing apparatus 301, the code stream is input into a coding parameter extractor 310 and a code stream characteristic amount extractor 320. On the other hand, the specific image is input into an image characteristic amount extractor 330.

The coding parameter extractor 310 extracts coding parameters of the code stream and supplies the coding parameters to a wavelet converter 331, a quantizer 332 and a code blocker 333 inside the image characteristic amount extractor 330. The coding parameter is a filter type or the number of times of wavelet conversion in the wavelet conversion, for example. The coding parameter is a quantization step size in the quantization, and a code block size in the code blocking.

The code stream characteristic amount extractor 320 has a code stream analyzer 321, and the code stream analyzer 321 analyzes a code stream and extracts the number of zero bit planes for each code block.

The image characteristic amount extractor 330 has the wavelet converter 331, the quantizer 332, the code blocker 333 and a zero bit plane number detector 334. The image characteristic amount extractor 330 detects the number of zero bit planes for each code block of the specific image based on the coding parameters of the code stream. Specifically, the wavelet converter 331 performs wavelet conversion on the specific image and generates a wavelet coefficient for each subband, and the quantizer 332 quantizes the wavelet coefficient for each subband and generates a quantization coefficient. The code blocker 333 divides the quantization coefficient for each subband into code blocks and develops the quantization coefficient for each code block into bit planes, and the zero bit plane number detector 334 detects the number of zero bit planes for each code block.

A comparator 340 compares the number of zero bit planes supplied from the code stream analyzer 321 with the number of zero bit planes supplied from the zero bit plane number detector 334, thereby making a matching decision between the code stream and the specific image and outputting a decision result.

Figure 6:
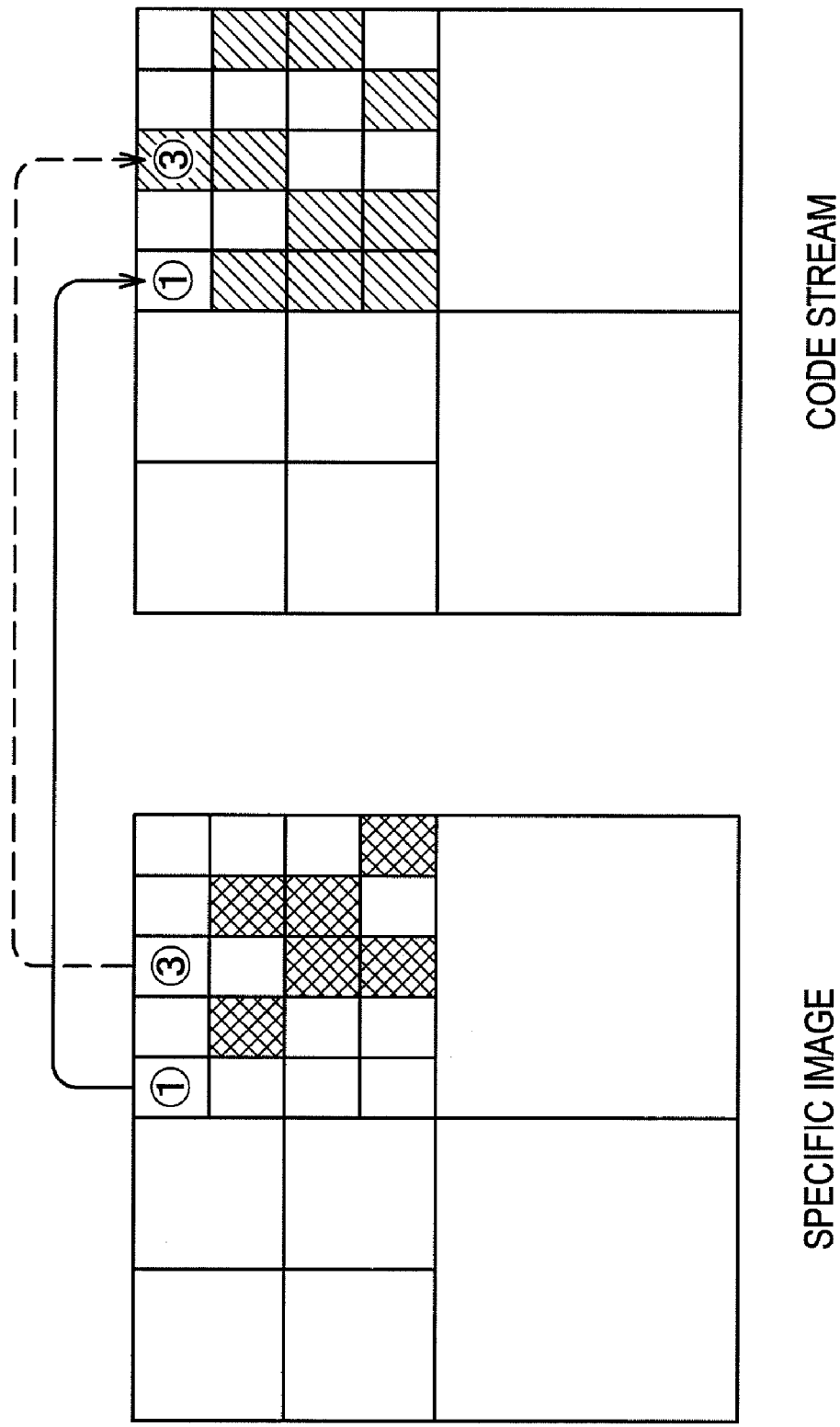
FIG. 6 is a diagram for explaining a comparison between code blocks at the same position.

In the comparison by the comparator 340, the code blocks at the same position are compared with each other to output a decision result indicative of being matched or not as shown in FIG. 6.

The processings of the image comparing apparatus 301 will be described together with the comparing method by the comparator 340. At first, the coding parameter extractor 310 extracts coding parameters of the code stream. The wavelet converter 331, the quantizer 332 and the code blocker 333 inside the image characteristic amount extractor 330 perform wavelet conversion and quantization on the specific image and divide the specific image into code blocks based on the coding parameters.

Next, a decision is made as to whether an unprocessed code block is present within the code stream, and when an unprocessed code block is present, a subsequent unprocessed code block of the code stream is set and a code block of the specific image corresponding to the unprocessed code block is set. Then, the numbers of zero bit planes are compared between the code block of the corresponding code stream and the code block of the specific image, and a decision is made as to whether the numbers of zero bit planes are matched. When the numbers of zero bit planes do not match, it is decided that the code stream does not match with the specific image, and when the numbers of zero bit planes match, a decision is made as to whether a further subsequent unprocessed code block is present. On the other hand, when an unprocessed code block is not present, that is, when the numbers of zero bit planes of all the code blocks match, it is decided that the code stream matches with the specific image.

As described above, according to the image comparing apparatus 301 described in Japanese Patent Application Laid-Open No. 2006-285615, the numbers of zero bit planes are compared between the code blocks at the same position for the code stream and the specific image. Then, depending on whether the numbers of zero bit planes match among all the code blocks, a matching decision (identification) can be made for the uncoded image of the code stream and the specific image. In this case, the number of zero bit planes is only extracted from the code stream and the code stream is not completely decoded so that the processings such as MQ decoding, bit modeling, inverse quantizing and inverse wavelet converting are not required.

[Desired Improvements]

In JPEG 2000 standard, a quantization step size $\Delta b$ is defined in the following (Equation 1). In the (Equation 1), Rb denotes a dynamic range of image signal, b denotes a subband, $\epsilon b$ denotes an exponent value, and $\mu b$ denotes a significand value. Similarly, the maximum number of allowable bit planes Mb is defined in the following (Equation 2).

$$\Delta b = 2RE(1+\mu b/211) \quad \text{(Equation 1)}$$

$$Mb = G + \epsilon b - 1 \quad \text{(Equation 2)}$$

where RE=Rb·$\epsilon$b

Thus, if the value of the quantization step size changes, $\epsilon$b as one factor thereof changes and therefore the value of Mb also changes. Therefore, the total number of bit planes changes depending on the difference in the value of the quantization parameter at the time of JPEG 2000 coding.

FIGS. 3A to 3C illustrate a relationship between subbands, code blocks and bit planes generated after the wavelet conversion. The code block size is typically 64×64 or 32×32, but in the example of FIG. 3, 4×3 is assumed for convenient explanation. The quantization coefficient value is classified into sign (±) and absolute value information, and the latter is developed into bit planes generated by binary expression.

The bit planes whose coefficient values are all 0 are called zero bit plane among the bit planes from MSB (Most Significant Bit) to LSB (Least Significant Bit). Thus, in the case of FIGS. 3A to 3C, the number of zero bit planes is 2.

Figures 7A, 7B:
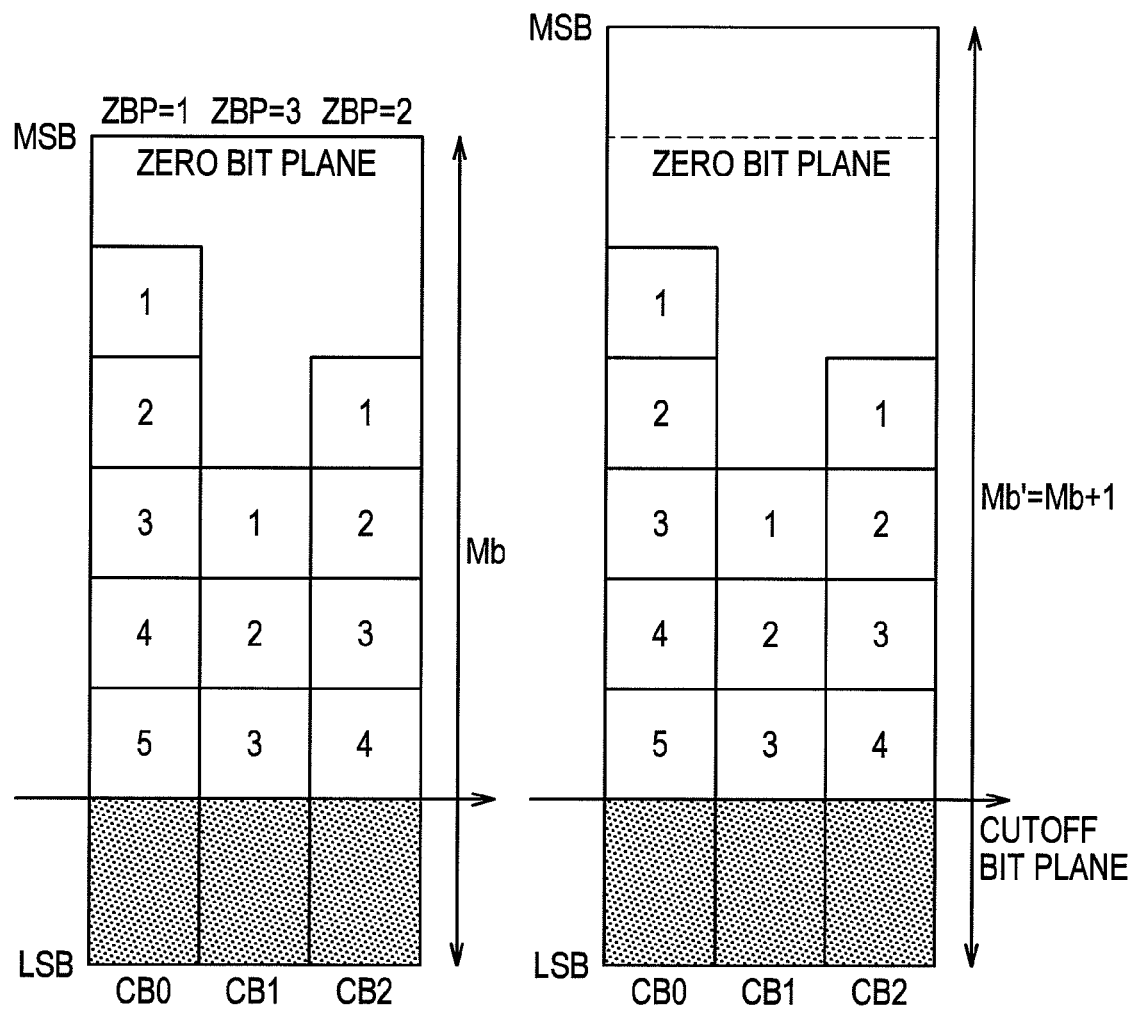
FIGS. 7A and 7B are diagrams for explaining how the maximum number of bit planes changes depending on a quantization step size.

On the contrary, FIGS. 7A and 7B illustrate effective bit planes, zero bit planes and cutoff bit planes from MSB to LSB in the three code blocks (CB0, CB1, CB2). FIG. 7A shows a case where the maximum number of bit planes is Mb, and the order from the left code block is assumed as follows:

CB0: zero bit plane (ZBP)=1
CB1: zero bit plane (ZBP)=3
CB2: zero bit plane (ZBP)=2

The bit plane at the lowest side is cut off as a result of the rate control, and thus is not contained in the effective bit plane.

On the other hand, FIG. 7B shows a case where the maximum number of bit planes Mb' is Mb+1, that is, the number is larger than the case of FIG. 7A by 1. In this case, the number of zero bit planes automatically increases by 1. Thus, from the above, it can be seen that if the value of the quantization step size changes, the value of Mb also changes and consequently the number of zero bit planes also changes.

Thus, if the quantization step size is different between the code stream and the specific image, the numbers of zero bit planes are different so that the code stream and the specific image may not be compared by the comparator 340 and the above matching decision may not be made.

In terms of the above points, in the embodiments of the present invention, when the code stream and the specific image are compared with each other, even if the numbers of zero bit planes are different because the quantization step size is different therebetween, the comparison can be made with high accuracy.

In other words, in the embodiments of the present invention, a vector (or vector value) indicative of a correlation (such as difference) between the number of zero bit planes of the code block of interest and the number of zero bit planes of one or more code blocks neighboring (or adjacent) thereto is assumed as the characteristic amount. This is because even when the quantization step size is different, the correlation between quantization coefficients to be generated, for example, the difference relationship does not change so that the comparison can be made with high accuracy by assuming the vector indicative of the difference between the numbers of zero bit planes as the characteristic amount.

3. First Embodiment

Schematic Configuration of First Embodiment

An image comparing apparatus according to a first embodiment of the present invention will be described below with reference to FIG. 8. FIG. 8 is a block diagram showing a schematic configuration of the image comparing apparatus according to the first embodiment of the present invention.

Figures 9, 10:
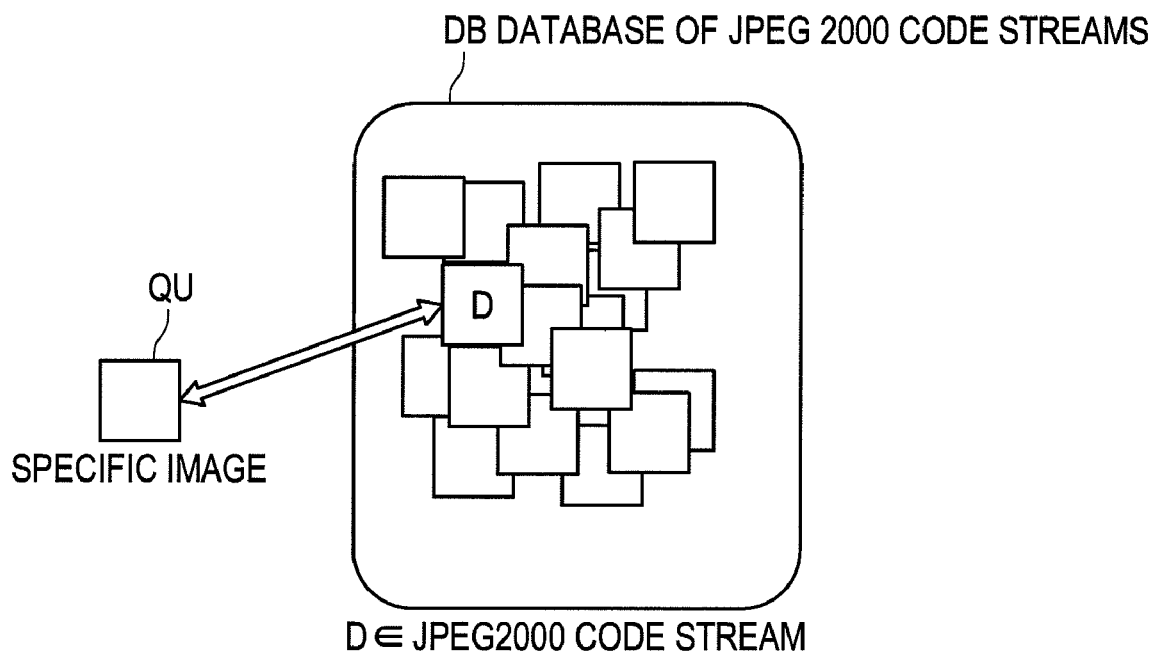
FIG. 9 is a diagram for explaining how to retrieve a specific image in database of JPEG 2000 code streams.
FIG. 10 is a diagram for explaining one code block of interest to be processed and eight adjacent code blocks in eight directions therearound.

The image comparing apparatus 1 shown in FIG. 8 compares a code stream 500 input from one terminal with a specific image 501 input from the other terminal to make a matching decision (identification). The code stream 500 is coded and obtained in JPEG 2000 system, for example, and is stored and held in database DB of the JPEG 2000 code streams as shown in FIG. 9, for example. The embodiments of the present invention are directed for retrieving or identifying the same image D as the specific image QU from among the JPEG 2000 code streams stored and held in the database DB.

In the image comparing apparatus 1, the code stream 500 is input into a coding parameter extracting unit 10 and a code stream characteristic amount extracting unit 20. On the other hand, the specific image 501 is input into a specific image characteristic amount output unit 30. A difference between the image comparing apparatus shown in FIG. 8 and the image comparing apparatus described in Japanese Patent Application Laid-Open No. 2006-285615 lies in that a vector calculating unit 22 and a vector calculating unit 35 are provided. A comparison between a vector 504 from the vector calculating unit 22 and a vector 509 from the vector calculating unit 35 is made in units of code block at the same position as shown in FIG. 6.

The coding parameter extracting unit 10 extracts coding parameters 502 of the code stream 500 and supplies the coding parameters 502 to a wavelet converting unit 31, a quantizing unit 32 and a code blocking unit 33 within the specific image characteristic amount output unit 30. The coding parameters 502 indicate how a quantization coefficient for each code block is created. For example, a filter type (inverse 5-3 filter, irreversible 9-7 filter or others) or the number of times of wavelet conversion (five times, four times or others) may be assumed in the wavelet conversion, for example. Further, a quantization step size (1/128, 1/64 or others) is assumed in the quantization, and a code block size (64×64, 32×128, 32×32 or others) is assumed in the code blocking.

The quantization step size does not need to be the same as the code stream's. This is because a comparison is made by using a vector (or vector value) indicative of a correlation between the numbers of zero bit planes of adjacent code blocks. For the coding parameters other than the quantization step size, the code stream has only to be analyzed once, or may be extracted prior to the identification processing, for example. Alternatively, the coding parameters other than the quantization step size are not all required, and only the parameters necessary for finding the number of zero bit planes of the code block are required for coding the specific image 501 up to the code blocking. For example, a bit cutoff parameter defined in JPEG 2000 coding is not required since it does not influence the number of zero bit planes. In other words, the coding parameters to be extracted from the code stream 500 by the coding parameter extracting unit 10 and to be supplied to the specific image characteristic amount output unit 30 are the parameters other than the quantization step size among the coding parameters necessary for finding the number of zero bit planes. The quantization step size when performing the coding up to the code blocking on the specific image 501 and finding the number of zero bit planes may appropriately use an arbitrary quantization step size even if it is different from the quantization step size of the code stream 500.

The code stream characteristic amount extracting unit 20 has a code stream analyzing unit 21 and a vector calculating unit 22, and the code stream analyzing unit 21 analyzes the code stream 500 to extract the number of zero bit planes 503 for each code block. The vector calculating unit 22 calculates a vector (or vector value) 504 based on a correlation between the numbers of zero bit planes of the adjacent code blocks as described later. For this vector, a vector can be used, in which a difference between the number of zero bit planes of a code block of interest and the number of zero bit planes of a code block adjacent to the code block of interest is assumed as an element.

The specific image characteristic amount output unit 30 has the wavelet converting unit 31, the quantizing unit 32, the code blocking unit 33, a zero bit plane number detecting unit 34 and the vector calculating unit 35. The specific image characteristic amount output unit 30 detects the number of zero bit planes for each code block when coding a specific image based on the coding parameters of the code stream, and calculates a vector based on a correlation between the numbers of zero bit planes of the adjacent code blocks. Specifically, the wavelet converting unit 31 performs wavelet conversion on the specific image 501 and generates a wavelet coefficient 505 for each subband. The quantizing unit 32 quantizes the wavelet coefficient 505 for each subband and generates a quantization coefficient 506. The quantization step size in this quantization does not need to be equal to the quantization step size obtained by analyzing the code stream 500 as described above, and may be appropriately set at the time of quantization. The code blocking unit 33 divides the quantization coefficient 506 for each subband into code blocks 507, and develops the quantization coefficient for each code block into bit planes. The zero bit plane number detecting unit 34 detects the number of zero bit planes 508 for each code block. The vector calculating unit 35 calculates a vector 509 based on a correlation between the numbers of zero bit planes of the adjacent code blocks as described later.

A comparing unit 40 compares a vector 504 supplied from the vector calculating unit 22 with a vector 509 supplied from the vector calculating unit 35, thereby making a matching decision between the code stream and the specific image and outputting a decision result 510.

[Example of Vector Calculation]

A specific example of calculating the vector (or vector value) will be described below with reference to FIG. 10.

FIG. 10 shows one example of a code block of interest to be processed during the comparison processing and its neighboring code blocks, in which the code block of interest, which is a shaded area at the center position of FIG. 10, and its adjacent code blocks in eight directions therearound are shown. A numeral within each code block in FIG. 10 denotes the number of zero bit planes.

As described together with FIGS. 7A and 7B, if the value of the quantization step size changes, the maximum number of bit planes changes and consequently the number of zero bit planes changes. However, when FIG. 7A and FIG. 7B are compared with each other, a correlation between the numbers of zero bit planes of the adjacent code blocks does not change. In other words, the number of zero bit planes of the code block CB0 is subtracted from the number of zero bit planes of the code block CB1 at the center of FIGS. 7A and 7B so that (−2) is obtained, and the number of zero bit planes of the code block CB2 is subtracted therefrom so that (−1) is obtained. This correlation does not change between the case of the maximum number of bit planes=MB in FIG. 7A and the case of the maximum number of bit planes Mb'=Mb+1 in FIG. 7B. In consideration of the points, a correlation between the numbers of zero bit planes of the code block of interest and the adjacent code block is expressed by a vector so that the code stream and the specific image can be compared with each other even if the quantization step size is different therebetween.

Figure 11A:
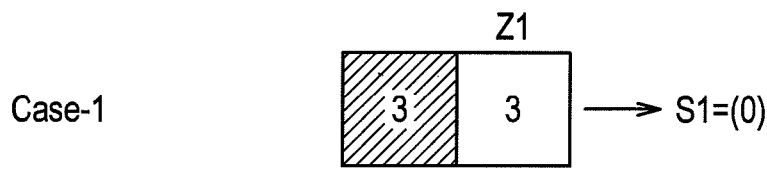
FIGS. 11A to 11C are diagrams showing three patterns of adjacent code blocks for calculating a vector indicative of a correlation between zero bit planes of a code block of interest and adjacent code blocks.
Figure 11B:
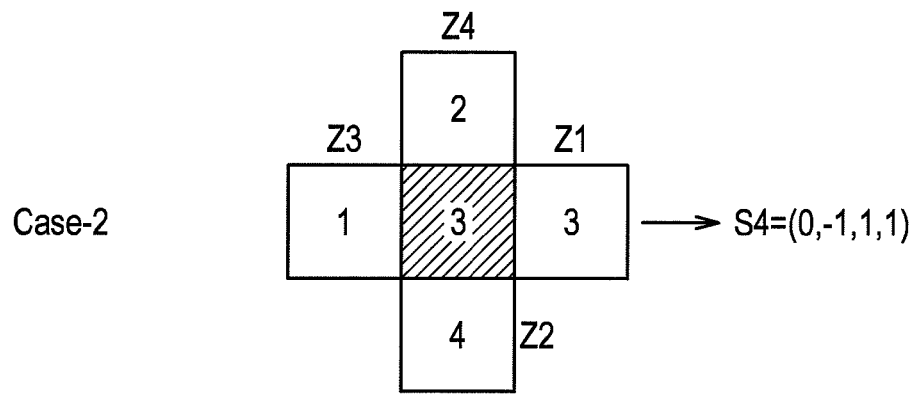
Figure 11C:
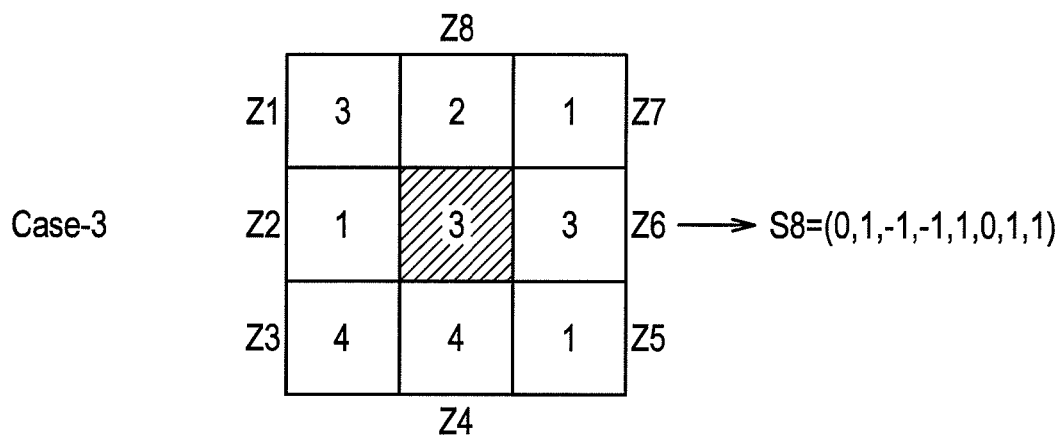

Various examples may be assumed for the code blocks adjacent to the code block of interest, but specific examples of calculating a vector are shown for the three cases of Case-1, Case-2 and Case-3 in FIGS. 11A to 11C. The shaded code blocks in FIGS. 11A to 11C are the code blocks of interest to be processed.

Generally, the number of zero bit planes of the code block of interest is assumed as Z, the number of code blocks neighboring (for example, adjacent) to the code block of interest is assumed as n, and the number of zero bit planes for each adjacent code block is assumed as Z1, Z2, ..., Zn−1, or Zn. Here, vector Sn is expressed as follows:

$$Sn = (s1, s2, \ldots, sn-1, sn) \quad \text{(Equation 3)}$$

The i-th (1≦i≦n) element "si" of the vector Sn meets the next conditional equation.

$$Si = 1 \, (\text{if } (Z-Zi) > 0)$$

$$0 \, (\text{if } Z-Zi = 0)$$

$$-1 \, (\text{if } (Z-Zi) < 0) \quad \text{(Equation 4)}$$

In other words, the i-th (1≦i≦n) element "si" of the vector corresponds to a sign (1 at positive, 0 at 0, −1 at negative) of the value obtained by subtracting the number of zero bit planes Zi of the i-th adjacent code block from the number of zero bit planes Z of the code block of interest. Alternatively, the element "si" may be a decision result on the difference between the number of zero bit planes Z of the code block of interest and the number of zero bit planes Zi of the i-th adjacent code block. Additionally, the vector indicative of the correlation between the numbers of zero bit planes of the adjacent code blocks may employ the differential value itself as the vector element, for example.

In the three cases of Case-1, Case-2 and Case-3 of FIGS. 11A to 11C, in the Case-1, a correlation between the number of zero bit planes of the code block of interest and the number of zero bit planes of the right-adjacent code block is denoted by vector S1. In the Case-2, a correlation between the number of zero bit planes of the code block of interest and the numbers of zero bit planes of the four code blocks upper-, lower-, right- and left-adjacent thereto is denoted by vector S4. In the Case-3, a correlation between the number of zero bit planes of the code block of interest and the numbers of zero bit planes of the eight code blocks upper-, lower-, right-, left- and oblique-adjacent thereto is denoted by vector S8.

In the case of FIGS. 11A to 11C, each vector S1, S4 or S8 in each case Case-1, Case-2 or Case-3 is as follows:

(1) Case-1

A difference decision is made between the number of zero bit planes (Z) of the code block of interest and the number of zero bit planes of the right-adjacent code block so that S1=3−3=0 is obtained.

(2) Case-2

Similarly as in the Case-1, a difference decision is made between the number of zero bit planes (Z) of the code block of interest and the numbers of zero bit planes (Z1 to Z4) of the four surrounding (upper, lower, right and left) code blocks so that S4=(0, −1, 1, 1) is obtained.

(3) Case-3

A similar calculation as in each case described above is made on the numbers of zero bit planes (Z1 to Z8) of the eight code blocks in eight directions so that S8=(0, 1, −1, −1, 1, 0, 1, 1) is obtained.

For comparison by the comparing unit 40, any one of the above Case-1, Case-2 and Case-3, or two or more vectors are used to compare the vectors of the code blocks of interest at the same position between the code stream and the specific image. Then, when the vectors match with each other for all the code blocks in the code stream and the specific image or for certain code blocks, it is decided (identified) that the image of the code stream is the same as the specific image.

[Explanation of Operations of Image Comparing Apparatus]

One example of the identification processing in the image comparing apparatus 1 will be described below with reference to the flowchart of FIG. 12 together with the comparing method in the comparing unit 40 of the image comparing apparatus 1 in FIG. 8. The code stream 500 of FIG. 8 is read out and supplied from the database DB storing therein the JPEG 2000 code streams as shown in FIG. 9, for example. The image comparing apparatus 1 of FIG. 8 is used to retrieve the same image as the specific image from among the JPEG 2000 code streams stored and held in the database DB, for example.

The coding parameters 502 of the code stream 500 of FIG. 8 are extracted by the coding parameter extracting unit 10 and supplied to the wavelet converting unit 31, the quantizing unit 32 and the code blocking unit 33 inside the specific image characteristic amount output unit 30. The coding parameters 502 to be extracted from the code stream 500 may be only the coding parameters not containing a quantization step size in JPEG 2000 coding system. The coding parameters not containing a quantization step size may include DWT filter, DWT decomposition level number, code block size and the like.

Figure 12:
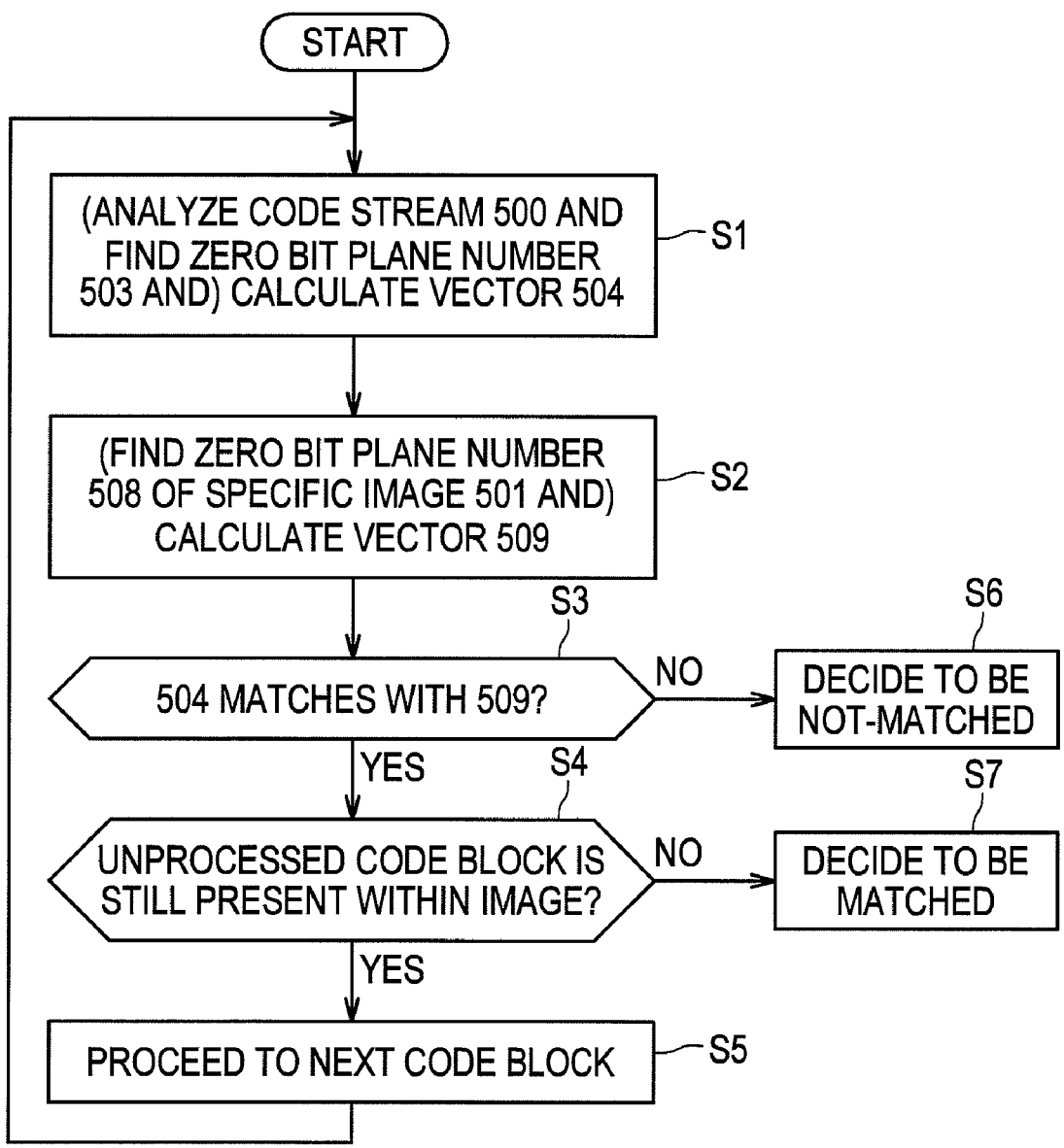
FIG. 12 is a flowchart for explaining operations of the image comparing apparatus according to the first embodiment of the present invention.

In step S1 of FIG. 12, the code stream characteristic amount extracting unit 20 of FIG. 8 outputs the vector 504 as the characteristic amount of the code stream 500. In other words, the vector calculating unit 22 calculates the vector 504 based on the number of zero bit planes 503 for each code block extracted by analyzing the code stream 500 by the code stream analyzing unit 21 in the code stream characteristic amount extracting unit 20. The vector 504 is the characteristic amount indicative of the correlation between the number of zero bit planes of the code block of interest to be processed in the input code stream and the number of zero bit planes of the code block adjacent to the code block of interest, as described above. The JPEG 2000 code stream is made of multiple packets, and each packet is made of a packet header and a packet body. The packet header stores therein information such as the number of coding passes of each code block and the number of zero bit planes. In other words, the number of zero bit planes of the code block can be obtained only by analyzing the packet header without decoding the same.

In step S2, the specific image characteristic amount output unit 30 of FIG. 8 outputs the vector 509 of the code block of the specific image 501 at the same position as the code block of interest in the code stream. In other words, the wavelet converting unit 31, the quantizing unit 32 and the code blocking unit 33 first perform JPEG 2000 coding on the specific image 501 based on the coding parameters 502 of the code stream 500 extracted by the coding parameter extracting unit 10. The code block 507 from the code blocking unit 33 is sent to the zero bit plane number detecting unit 34 and the zero bit plane number detecting unit 34 detects the number of zero bit planes 508 for each code block. Then, the vector calculating unit 35 calculates the vector 509 based on the correlation between the numbers of zero bit planes of the adjacent code blocks and outputs the same as the characteristic amount of the specific image 501 to the comparing unit 40.

In next step S3 of FIG. 12, the vector 504 of the code block of interest in the code stream 500 is compared with the vector 509 of the code block at the same position as the specific image 501 to decide whether both the vectors match with each other. When matched (YES), the processing proceeds to step S4, and when not matched (NO), the processing proceeds to step S6 and it is decided that the image of the code stream does not match with the specific image, as described later.

In step S4, a decision is made as to whether an unprocessed code block is still present inside the image of the code stream, and if an unprocessed code block is present (YES), the processing proceeds to step S5. If an unprocessed code block is not present (NO), that is, when the vector matching decision is finished for all the code blocks to be processed, the processing proceeds to step S7 and it is decided (identified) that the image of the code stream matches with the specific image, as described later.

In step S5, the processing proceeds to a subsequent unprocessed code block within the image of the code stream to assume this as a new code block of interest, and then returns to step S1. In step S1, a vector indicative of the correlation (difference) between the numbers of zero bit planes of the adjacent code blocks is calculated for the updated code block of interest within the image of the code stream. In step S2, a vector for the code block at the same position as the updated code block of interest within the specific image is calculated. Subsequently to step S3, the matching decision (identification) processing similar to the above is performed.

In steps S1 and S2, the analysis of the code stream or the code blocking of the specific image does not need to be performed every time, and only the processing of calculating the vector 504 or 509 for the code block of interest to be processed may be performed. For example, the numbers of zero bit planes for all the code blocks to be processed within the image may be previously found, or the numbers of zero bit planes of all the code blocks may be collectively calculated for each subband.

In step S3, if there is detected a code block in which one vector is not matched, the processing is not performed on the remaining code blocks and proceeds to step S6, where it is decided that the image of the code stream does not match with the specific image.

On the contrary, in step S4, the case where an unprocessed code block is not present corresponds to the case where the vectors of all the code blocks to be processed within the image of the code stream completely match with the vector of the code block at the corresponding position of the specific image. Thus, the processing proceeds to step S7, where it is decided (identified) that the image of the code stream matches with the specific image.

A decision as to whether the vectors 504 and 509 of the code block and the specific image match or not in step S3 will be described. In the case of the vector Sn made of n elements "si" ($1 \leq i \leq n$) described together with FIGS. 11A to 11C, if all the elements "si" completely match, the vectors 504 and 509 will match with each other.

As indicated in the above (Equation 4), the i-the ($1 \leq i \leq n$) element "si" of the vector Sn corresponds to a sign of the value obtained by subtracting the number of zero bit planes $Z_i$ of the i-th adjacent code block from the number of zero bit planes Z of the code block of interest. In other words, when the obtained value is positive, the i-the element is 1, when the obtained value is 0, the i-th element is 0, and when the obtained value is negative, the i-th element is −1. In this case, a condition for the matching of the elements "si" may be based on the fact that the vector elements "si" are completely equal to each other between the image of the code stream and the specific image, but if either one value is 0, it may be decided that the image of the code stream matches with the specific image. In other words, also when one of the vector elements "si" is −1 and the other is 0 or when one is 0 and the other is 1, it is decided that the image of the code stream matches with the specific image. This is based on the fact that in the case of si=0, when the same original image is quantized with a different quantization step size, the difference (si) of the zero bit planes may change. It is decided that the image of the code stream matches with the specific image when one vector element "si" is 0, thereby preventing missed identification.

Under the matching condition of the elements "si" described above, when all the elements "si" of the vector of the code block and the vector of the code block at the corresponding position of the specific image completely match one another, it is decided that each vector matches.

Figure 13:
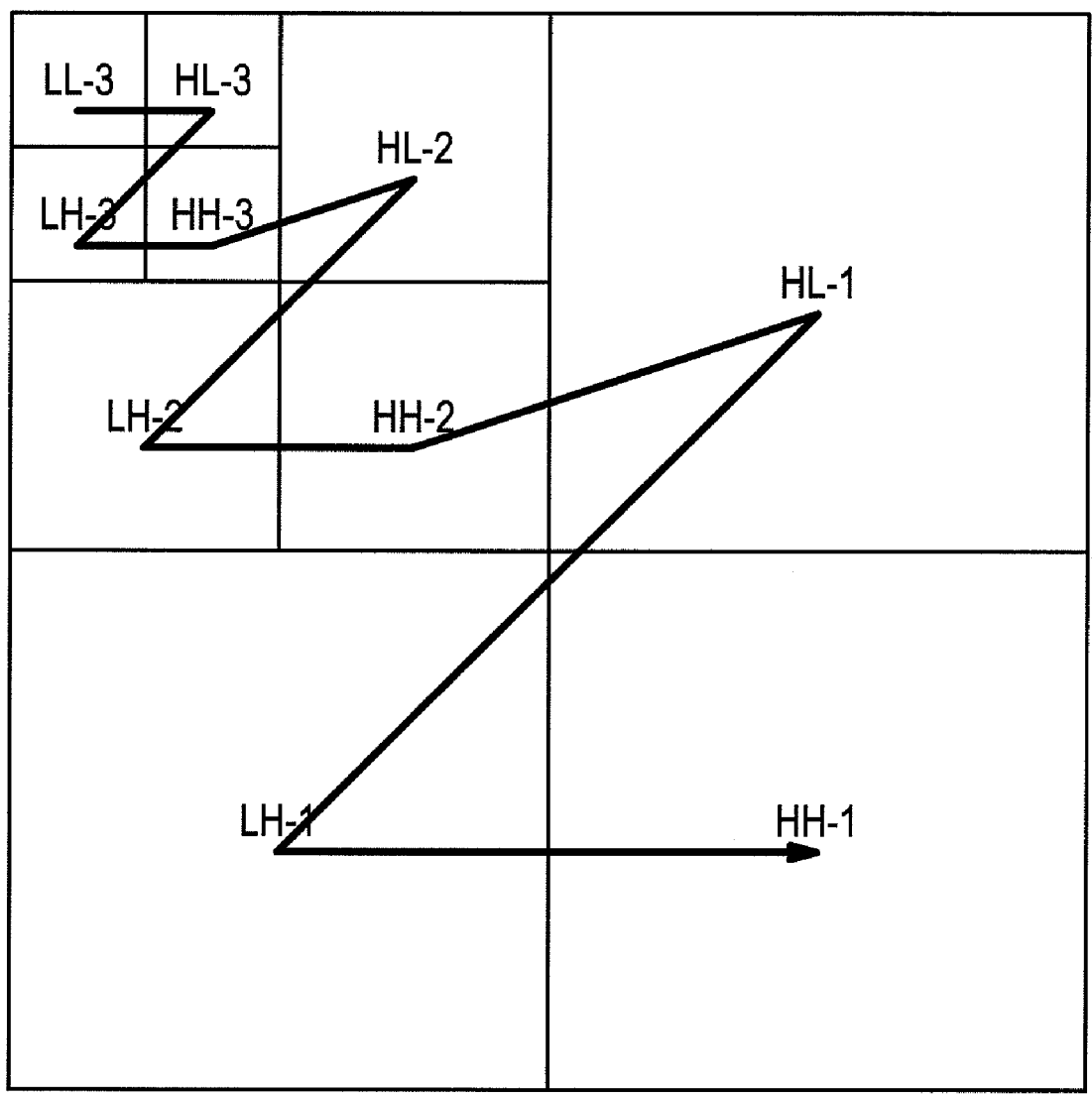
FIG. 13 is a diagram for explaining a subband selecting order and a comparison within specific subbands.

The order of selecting the unprocessed code blocks (order of selecting the code blocks of interest) may be arbitrary, but if the order is the same as the order in which the code blocks are arranged in the code stream, the processing is simple and preferable. The order in which the code blocks are arranged in the code stream is typically from the low-pass subband to the high-pass subband, and if the wavelet conversion has been performed three times, is as shown in FIG. 13. In the example of FIG. 13, starting with the lowest-pass LL-3 subband, the order of LL-3, HL-3, LH-3, HH-3, HL-2, LH-2, HH-2, HL-1, LH-1 and HH-1 is employed. Further, the raster scan order is employed in each subband. In the case of a typical image, an unprocessed code block is selected in the order from the low-pass subband to the high-pass subband so that a non-matching decision can be made a small number of loop times. When an interlace component of the image is characteristic, since the interlace component appears in a subband indicated as LH-1 of FIG. 13, the code blocks in this subband are selected in an order capable of performing a processing faster so that the not-matching decision can be made a small number of loop times.

The vectors of all the code blocks are compared in the above explanation, but all the code block are not necessarily compared. As shown in FIG. 13, in the example where the wavelet conversion is divided into three to form 10 subbands, matching may be taken in the four low-pass subbands (LL-3, HL-3, LH-3, HH-3). In this case, since there can be utilized the fact that many items of information concentrate on the low-pass component due to the characteristics of the wavelet conversion, and the number of code blocks is remarkably smaller than in the entire screen, the comparison calculating can be terminated fast while restricting a decrease in accuracy.

In this manner, in the image comparing apparatus 1 according to the present embodiment, the vectors are compared between the code blocks at the same position for the code stream and the specific image, and the matching decision is made depending on whether the vectors of all the code blocks to be processed match. Thus, even if the quantization step size is different, the image matching decision (identification) can be made with high accuracy. Particularly, since one has only to extract the number of zero bit planes from the code stream and to calculate the vector, and does not have to completely decode the code stream, there is an advantage that the processings such as MQ decoding, bit modeling, inverse quantizing and inverse wavelet converting are not required. Among them, only header analysis is required for extracting the number of zero bit planes from the code stream and the MQ code does not need to be decoded, which is remarkably advantageous for the simple processing and the processing speed.

4. Second Embodiment

Schematic Configuration of Second Embodiment

An image comparing apparatus according to a second embodiment of the present invention will be described with reference to FIG. 14.

The first embodiment of the present invention shown in FIG. 8 is an example in which coding parameters are extracted from the code stream 500 and the extracted coding parameters (not containing a quantization step) are utilized when coding the specific image 501. However, when the coding parameters of the code stream 500 are previously known, as shown in FIG. 14, the second embodiment may be configured such that the parameter information from the coding parameter output unit 36 is supplied to each part in a specific image characteristic amount output unit 30A.

Figure 14:
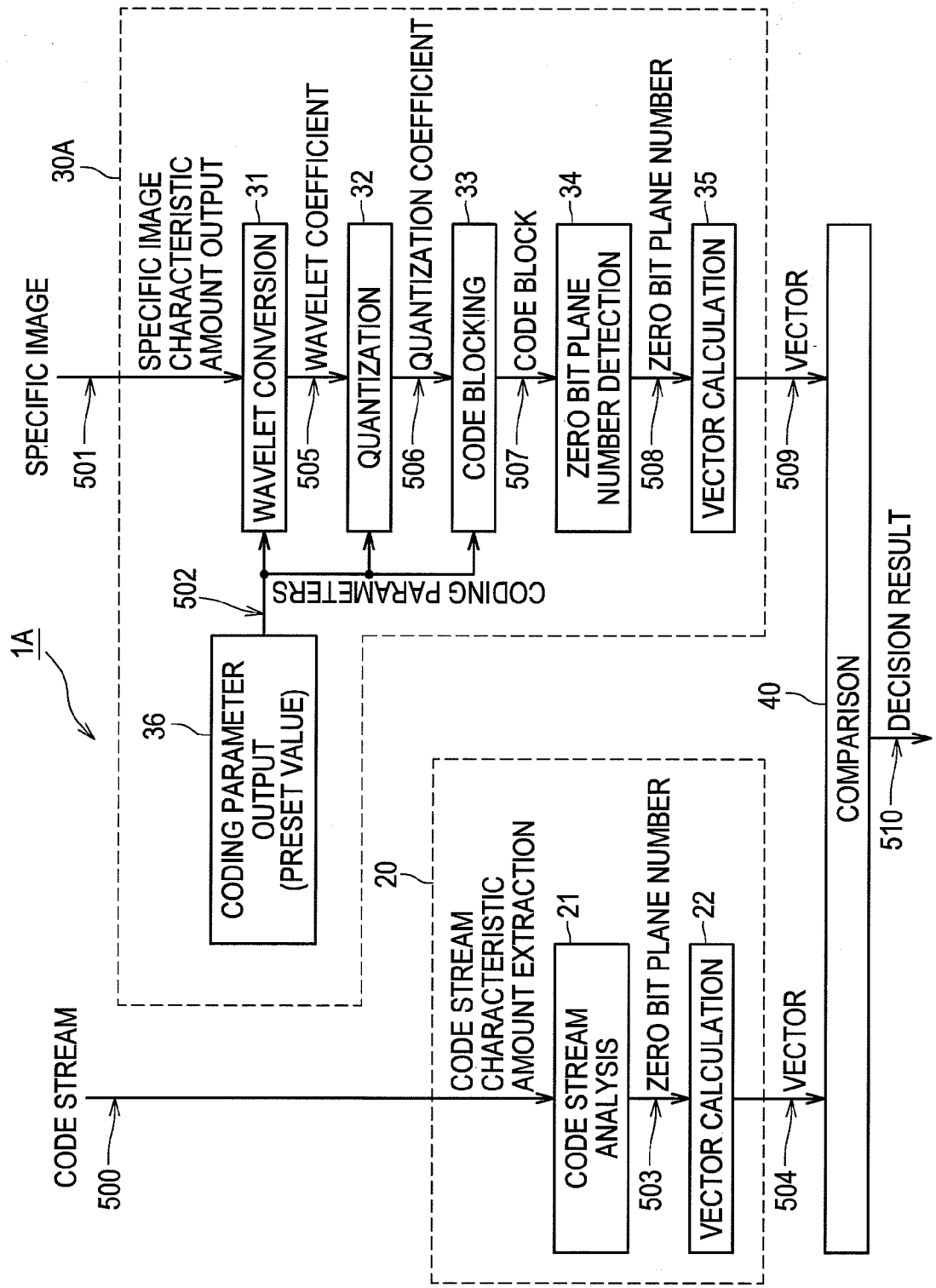
FIG. 14 is a block diagram showing a schematic configuration of an image comparing apparatus according to a second embodiment of the present invention.

In other words, an image comparing apparatus 1A according to the second embodiment of the present invention shown in FIG. 14 has a coding parameter output unit 36 for outputting coding parameters (preset values) 502 obtained by previously analyzing the code stream 500 within the specific image characteristic amount output unit 30A. The coding parameters (preset values) 502 from the coding parameter output unit 36 are supplied to the wavelet converting unit 31, the quantizing unit 32 and the code blocking unit 33 inside the specific image characteristic amount output unit 30A.

The coding parameters may be a filter type or the number of times of wavelet conversion in the wavelet conversion, a quantization step size in the quantization, and a code block size in the code blocking, for example. In the present invention, as stated above, the quantization step size does not need to be the same as the code stream 500. Thus, when the database DB of the JPEG 2000 code streams shown in FIG. 9, for example, is constructed, the coding parameters not containing a quantization step size are preset or standardized so that the preset parameters can be used for retrieval. In other words, when coding the image for constructing the database DB of FIG. 9, the preset or standardized coding parameters (not containing a quantization step size) are used to perform JPEG 2000 coding. The quantization step size may be appropriately set at the time of the coding. The coding parameters other than the quantization step of the code stream in the thus constructed database DB remain the preset values so that the coding parameters (other than the quantization step size) can be obtained without analyzing the code stream. Additionally, in the case of the code stream for which the coding parameters other than the quantization step size for the coding are previously known or the code stream for which the parameter analysis has been already terminated, the code stream does not need to be analyzed for comparison. The coding parameter output unit 36 of FIG. 14 outputs and supplies such known coding parameters (other than a quantization step size) to the wavelet converting unit 31, the quantizing unit 32 and the code blocking unit 33 within the specific image characteristic amount output unit 30A.

The code stream characteristic amount extracting unit 20 has the code stream analyzing unit 21 and the vector calculating unit 22 similarly as in the first embodiment. The code stream analyzing unit 21 analyzes the code stream 500 and extracts the number of zero bit planes 503 for each code block, and the vector calculating unit 22 calculates the vector 504 indicative of the correlation between the numbers of zero bit planes of the adjacent code blocks.

The specific image characteristic amount output unit 30A has the wavelet converting unit 31, the quantizing unit 32 and the code blocking unit 33 for wavelet-converting, quantizing and code-blocking the specific image 501, respectively. The known coding parameters not containing a quantization step size from the coding parameter output unit 36 are supplied to the wavelet converting unit 31, the quantizing unit 32 and the code blocking unit 33. The quantization step size for the quantization in the quantizing unit 32 is appropriately set. The code block from the code blocking unit 33 is sent to the zero bit plane number detecting unit 34 so that the number of zero bit planes 508 is detected for each code block. The number of zero bit planes 508 from the zero bit plane number detecting unit 34 is sent to the vector calculating unit 35 so that the vector 509 is calculated based on the correlation between the numbers of zero bit planes of the adjacent code blocks.

The comparing unit 40 compares the vector 504 supplied from the vector calculating unit 22 with the vector 509 from the vector calculating unit 35 similarly as in the first embodiment, makes a matching decision between the code stream and the specific image, and outputs a decision result 510.

Operations of Second Embodiment

In the case of the image comparing apparatus 1A according to the second embodiment of the present invention shown in FIG. 14, the coding parameters not containing a quantization step size when coding a code stream in the database or the like to be retrieved are previously known and are supplied from the coding parameter output unit 36. Thus, unlike the first embodiment, the input code stream 500 does not need to be analyzed for extracting the coding parameters. The known coding parameters other than a quantization step size are read out from the coding parameter output unit 36 and supplied to the wavelet converting unit 31, the quantizing unit 32 and the code blocking unit 33 within the specific image characteristic amount output unit 30A.

The code stream characteristic amount extracting unit 20 outputs the vector 504 as the characteristic amount of the code stream 500. The vector 504 is the characteristic amount indicative of a difference relationship as a correlation between the number of zero bit planes of the code block of interest to be processed in the input code stream and the number of zero bit planes of one or more code blocks adjacent to the code block of interest.

The coding parameters (not containing a quantization step size) having the above preset values are used to perform wavelet converting, quantizing and code blocking on the specific image 501 by the specific image characteristic amount output unit 30A. The quantization step size in the quantization does not need to be the same as the code stream 500, and may be appropriately set. The zero bit plane number detecting unit 34 detects the number of zero bit planes 508 for each code block from the code blocking unit 33. The vector calculating unit 35 calculates the vector 509 of the code block at the same position as the code block of interest to be currently processed in the code stream characteristic amount extracting unit 20.

The comparing unit 40 compares the vector 504 of the code block of interest in the code stream 500 with the vector 509 of the code block at the same position as the specific image 501 to decide whether the vectors match with each other. If matched (YES), a decision is made as to whether an unprocessed code block is present within the image of the code stream, and a subsequent unprocessed code block is assumed as a new code block of interest to repeat the above comparison processing until an unprocessed code block is not present. If the vector 504 does not match with the vector 509 (NO), it is decided that the image of the code stream does not match with the specific image. Then, when the vectors of all the code blocks to be processed within the image of the code stream completely match with the vector of the code block at the corresponding position of the specific image, it is decided (identified) that the image of the code stream is the same as the specific image.

In the image comparing apparatus 1A according to the second embodiment of the present invention described above, the vectors are compared between the code blocks at the same position for the code stream and the specific image and a decision is made as to whether the vectors of all the code blocks to be processed match, thereby making a matching decision of the images. At this time, only the number of zero bit planes is extracted from the input code stream for calculating the vector, the code stream does not need to be completely decoded, and the code stream does not need to be analyzed for extracting the coding parameters. Further, even if the quantization step size is different, a matching decision (identification) can be made with high accuracy. Thus, the processings such as MQ decoding, bit modeling, inverse quantizing and inverse wavelet converting are not required and the processing of extracting the coding parameters is not required, which is further advantageous for the simple processing and the processing speed.

5. Third Embodiment

Schematic Configuration of Third Embodiment

Figure 15:
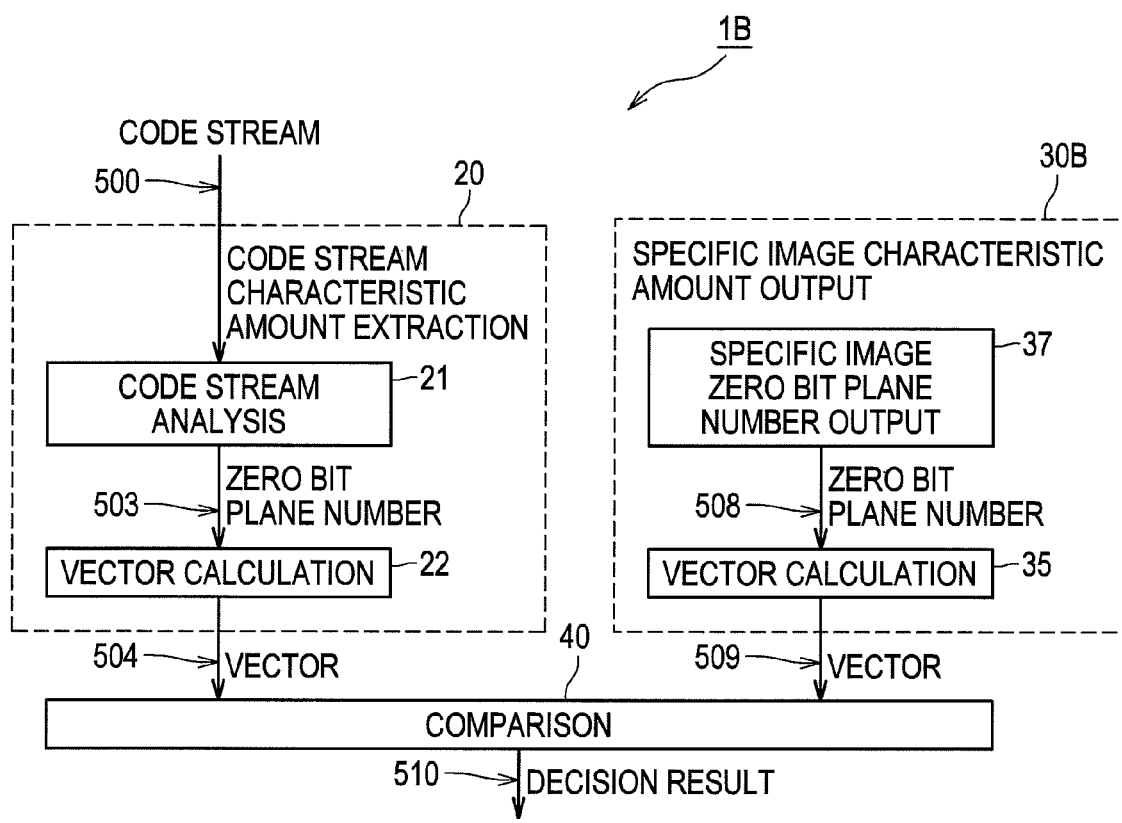
FIG. 15 is a block diagram showing a schematic configuration of an image comparing apparatus according to a third embodiment of the present invention.

FIG. 15 is a block diagram showing a schematic configuration of an image comparing apparatus 1B according to a third embodiment of the present invention.

The image comparing apparatus 1B shown in FIG. 15 may not only use the known coding parameters (preset values) in obtaining the characteristic amount of a specific image and can but also be applied to a case where the specific image is also previously known before the comparison like the image comparing apparatus 1A according to the second embodiment. In other words, when the specific image as search query is previously known like a TV program's title screen, for example, the known coding parameters can be used to code the known specific image at least up to the code blocking prior to the comparison processing. A specific image characteristic amount output unit 30B of FIG. 15 stores the number of zero bit planes for each code block of the previously-code-blocked specific image and outputs the same from the zero bit plane number output unit 37 of the specific image. The number of zero bit planes 508 for each code block from the zero bit plane number output unit 37 of the specific image is sent to the vector calculating unit 35. The vector calculating unit 35 calculates the vector 509 indicative of the correlation between the numbers of zero bit planes of the adjacent code blocks as in the first and second embodiments. Other configuration and operations of the image comparing apparatus 1B according to the third embodiment are similar to those in the first and second embodiments, and thus the corresponding parts are denoted with like reference numerals and the description thereof will be omitted.

According to the third embodiment configured above, similarly as in the second embodiment, the coded code stream does not need to be completely decoded and the code stream does not need to be analyzed for extracting the coding parameters. Even if the quantization step size is different, the matching decision (identification) with the specific image can be made with high accuracy. Further, according to the third embodiment, since the number of zero bit planes for each code block is previously found from the known specific image, the processing of code-blocking the specific image and calculating the number of zero bit planes is not required when making a comparison for retrieval. Thus, the comparison processing time for the matching decision with the specific image can be remarkably reduced.

The number of zero bit planes for each code block of the specific image is found and stored therein in the zero bit plane number output unit 37 in the image comparing apparatus 1B shown in FIG. 15, but the vector for each code block of the specific image may be calculated and stored therein. In this case, there may be configured such that the vector of the code block at the same position of the specific image is read from the vector storing unit and compared in the comparing unit 40 with the above vector of the code block of interest output from the code stream characteristic amount extracting unit 20.

6. Fourth Embodiment

Schematic Configuration of Fourth Embodiment

An image retrieving apparatus for retrieving a code stream of an image matching with a specific image from among multiple code streams according to a fourth embodiment of the present invention will be described below with reference to FIG. 16.

Figure 16:
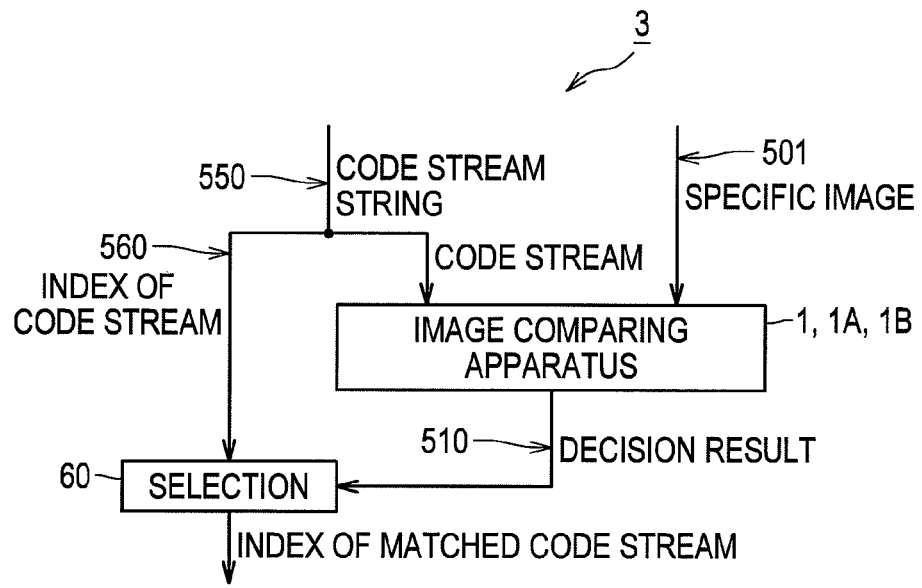
FIG. 16 is a block diagram showing a schematic configuration of an image retrieving apparatus according to a fourth embodiment of the present invention.

FIG. 16 is a block diagram showing an image retrieving apparatus 3 according to the fourth embodiment of the present invention. The image retrieving apparatus 3 is directed for retrieving a code stream matching with the specific image 501 input from one terminal from among a code stream string 550 as video contents input from the other terminal. The code stream string 550 is a set of code streams obtained by coding an image of each frame of an animation as video contents or multiple images in the image database in JPEG 2000 system.

In the image retrieving apparatus 3, the code stream string 550 is separated into the code stream 500 and its index 560. The code stream 500 is input into the image comparing apparatus 1 (or 1A, 1B) as described in the first to third embodiments, and the index 560 is input into a selecting unit 60. The specific image 501 is input into the image comparing apparatus 1 (or 1A, 1B).

The image comparing apparatus 1 is similar to that of the first embodiment, and makes a matching decision between the code stream and the specific image and supplies a decision result to the selecting unit 60. Any of the image comparing apparatuses 1A and 1B according to the second and third embodiments may be used instead of the image comparing apparatus 1. In the case of the image comparing apparatus 1B according to the third embodiment, since the number of zero bit planes of the specific image is previously stored in the zero bit plane number output unit 37 of FIG. 15, the specific image 501 does not need to be input in the comparison processing, of course. The selecting unit 60 outputs the index of the code stream which is decided to match with the specific image.

A processing of retrieving a code stream of an image matching with the specific image 501 from the code stream string 550 will be described with reference to the flowchart of FIG. 17 by using the image retrieving apparatus 3 having the above configuration.

Figure 17:
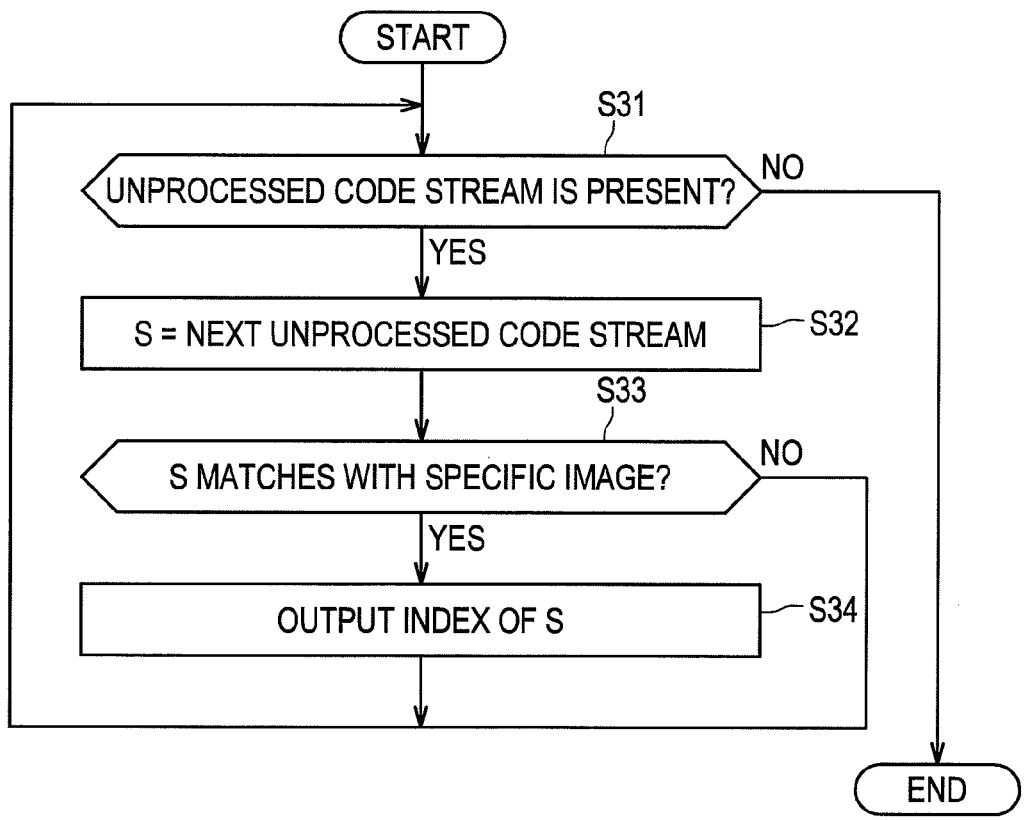
FIG. 17 is a block diagram showing operations of an image retrieving apparatus according to the fourth embodiment of the present invention.

At first, in step S31 of FIG. 17, a decision is made as to whether an unprocessed code stream is present within the code stream string, and if it is present, in step S32, a subsequent unprocessed code stream S is set. In step S33, a decision is made as to whether the code stream S matches with the specific image, and if not matched, the processing returns to step S31, and if matched, the index is output in step S34 and then the processing returns to step S31. On the other hand, if an unprocessed code stream is not present in step S31, the processing is terminated.

In this manner, the image retrieving apparatus 3 according to the fourth embodiment shown in FIG. 16 can retrieve a code stream matching with the specific image 501 from the code stream string 550 and output its index. Particularly, when the image comparing apparatus 1, 1A or 1B similar to the first to third embodiments is used to make a matching decision between each code stream configuring the code stream string and the specific image, the number of zero bit planes has only to be extracted from the code stream for calculating the vector. In other words, since the code stream does not need to be completely decoded, it is advantageous that the processings such as MQ decoding, bit modeling, inverse quantizing and inverse wavelet converting are not required. Even if the quantization step size is different, a matching decision can be made with high accuracy. Particularly, the coding parameters other than the quantization step size rarely change through the code stream string. Thus, the wavelet converting unit 31, the quantizing unit 32, the code blocking unit 33 and the zero bit plane number detecting unit 34 within the image comparing apparatus 1, 1A do not need to be operated for each code stream. Thus, the retrieval can be done with a less processing amount and high accuracy.

There will be considered that the image comparing apparatus described in Japanese Patent Application Laid-Open No. 2006-285615 is used to retrieve a code stream matching with the specific image from among multiple code streams compressed and coded by different quantization step sizes. In this case, it is required that the quantization step size is extracted for each input code stream and the extracted quantization step size is used to code the specific image (at least up to the code blocking). On the contrary, according to the embodiments of the present invention, since the quantization step size does not need to match with the quantization step size of the code stream, the specific image does not need to be coded up to the code blocking for each code stream and thereby the processing can be simplified. For example, if the common coding parameters other than the quantization step size are used to code-block the specific image and to once find the number of zero bit planes for each code block for the code stream string, the processing can be used for each code stream. If the specific image is previously defined, as in the third embodiment, the number of zero bit planes is output from the zero bit plane number output unit 37 of the specific image for each code block, thereby further simplifying the processing.

7. Experimental Examples of Embodiments

Simulation Examples

[Experimental Conditions of Image Comparing Apparatus of Embodiments]

The experimental examples (simulation examples) of the image comparing apparatus according to the embodiments of the present invention will be described below.

In the following experimental examples (simulation examples), a decision is made on an animation having 15691 frames in which the 3000-th frame is a specific image (query image) in a resolution of 1920 (H)×1080(V) and a format of RGB each having 8 bits. At first, the animation is coded in JPEG 2000 system by using the DWT decomposition level number of 5 (9×7 filter) as the wavelet converting filter and assuming the quantization base step size as $1/256$ and the code block size as 32×32. The coded data is supplied to the image comparing apparatus 1 as the code stream 500 of FIG. 8, for example. The 3000-th frame of the animation is used as the specific image 501 of FIG. 8. When the specific image 501 is subjected to the coding processing in the wavelet converting unit 31, the quantization unit 32 and the code blocking unit 33, the coding parameters other than the quantization step size are the same as the coding parameters of the animation. In other words, the coding parameters in the wavelet converting unit 31 and the code blocking unit 33 are the DWT decomposition level number of 5 (9×7 filter) and the code block size of 32×32. On the contrary, the quantization base step size in the quantizing unit 32 is a value different from the coding parameter of the animation, for example, $1/200$ or $1/300$. This is similar as in the second embodiment shown in FIG. 14. Further, the number of zero bit planes for each code block of the specific image 501 is obtained prior to the comparison deciding processing and is stored in the zero bit plane number output unit 37 of the specific image of FIG. 15 so that a similar experiment (simulation) can be performed also in the third embodiment.

There is shown in Table 1 the decision result when a matching decision (identification) is made for retrieving the specific image (query image) from the code stream of the animation by using the image comparing apparatus according to the embodiments of the present invention under the above conditions.

TABLE 1

| | Number of identified frames Base step size: $1/200$ | Number of identified frames Base step size: $1/300$ |
|---|---|---|
| S1 | 144 (Without missed identification) | 143 (Without missed identification) |
| S4 | 143 (Without missed identification) | 143 (Without missed identification) |
| S8 | 143 (Without missed identification) | 143 (Without missed identification) |
| Example in Japanese Patent Application Laid-Open No. 2006-285615 | 131 (With missed identification) | 131 (With missed identification) |

In Table 1, the vector indicative of the correlation with the number of zero bit planes employs the vectors S1, S4 and S8 described in FIGS. 11A to 11C. The decision result in the case of the image comparing apparatus described in Japanese Patent Application Laid-Open No. 2006-285615 is also shown as a comparative example. Under the above simulation conditions, 6321 code blocks are present in the used coded image. Thus, the matching rate is (number of matched code blocks)/6321.

Considerations on Decision Result

According to the decision result in Table 1, the matching decision could be made without missed identification also when any of the above vectors S1, S4 and S8 was used. On the contrary, in the image comparing apparatus described in Japanese Patent Application Laid-Open No. 2006-285615, if the quantization step size is different, the number of zero bit planes is different so that the identification will be missed.

According to Table 1, there are about 140 frames of erroneously identified images, and the images have only one luminance value such as white or black. A case in which all the bit planes of the code block are zero bit planes and no data to be coded is present in the code block is handled as a special status of "not included". In the image having only one luminance value, the code blocks as the zero bit plane number="not included" are so many and the code blocks capable of being used for decision is less. This is considered as a reason for which different images are erroneously decided to be the same.

It is preferable not to use the "not included" code blocks for decision in order to reduce erroneous identification. For example, for the values (−1, 0, 1) of the vector elements "si", if either one was 0, it was decided that the vectors match, but the conditions for a vector matching decision have to be the same as the case where the vectors are completely equal to each other. In this case, in order to prevent missed identification, it is preferable that an image having a similarity beyond a certain threshold is decided to be matched in combination with the similarity calculation described later.

8. Fifth Embodiment

Similarity Decision

Schematic Configuration of Fifth Embodiment

In the first to third embodiments described above, there was the condition that all the vectors match for all or predefined part of the code blocks in order to retrieve and identify the same uncoded image as the specific image from among the code streams. Further, if vectors does not match in one code block within the processing range, it was immediately decided that the vectors does not match without making a matching decision on the vectors of the remaining code blocks.

Figure 18:
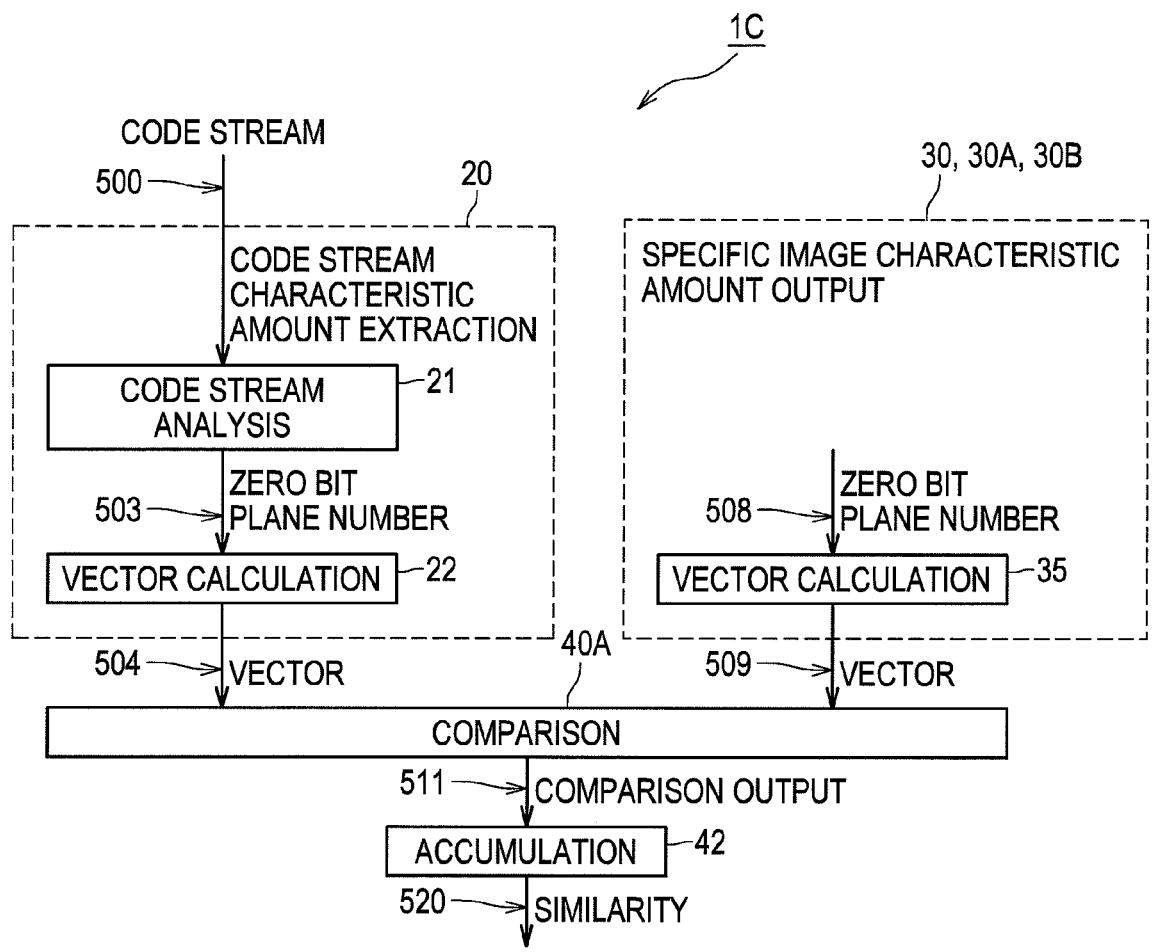
FIG. 18 is a block diagram showing a schematic configuration of an image comparing apparatus according to a fifth embodiment of the present invention.

On the contrary, according to the fifth embodiment of the present invention, in an image comparing apparatus 1C shown in FIG. 18, an uncoded image similar to the specific image is found from among the code stream or a similarity of the uncoded image is output.

The image comparing apparatus 1C shown in FIG. 18 includes the code stream characteristic amount extracting unit 20 and the specific image characteristic amount output unit 30 (or 30A, 30B) similarly as in the first to third embodiments described above. In other words, the code stream characteristic amount extracting unit 20 of FIG. 18 has the same configuration as the code stream characteristic amount extracting unit 20 according to the first to third embodiments. The specific image characteristic amount output unit of FIG. 18 may employ any one of the specific image characteristic amount output units 30, 30A and 30B according to the first to third embodiments.

The vector 504 from the vector calculating unit 22 in the code stream characteristic amount extracting unit 20 and the vector 509 from the vector calculating unit 35 in the specific image characteristic amount output unit 30 (or 30A, 30B) are sent to a comparing unit 40A and compared with each other. The comparing unit 40A sequentially outputs a comparison result 511 (containing matched or not matched) of the vectors for each code block at the corresponding position between the code stream and the specific image and sends the same to an accumulating unit 42. The accumulating unit 42 accumulates the comparison results 511 on the vectors for each code block from the comparing unit 40A for all the code blocks within the predefined processing range and outputs a similarity 520.

The image comparing apparatus 1C shown in FIG. 18 is similar to those in the first to third embodiments in its basis configuration, but is different in that it has the accumulating unit 42, which accumulates therein the comparison results 511 of the vectors for each code block supplied from the comparing unit 40A to calculate the similarity 520. Further, the comparing unit 40A does not make even a matching decision between the code stream and the specific image, and outputs the comparison results 511 containing a not-matched case of the vectors for each code block for all the code blocks within the predefined processing range.

Explanation of Operations of Fifth Embodiment

The processings or operations for calculating a similarity in the comparing unit 40A and the accumulating unit 42 in the image comparing apparatus 1C having the above configuration will be described with reference to the flowchart of FIG. 19. Various initialization processings such as setting a value of variable "same" and a value of variable "diff" used for similarity calculation at 0, and the extraction of the numbers of zero bit planes for each code block of the code stream and the specific image for calculating the vectors 504 and 509 are omitted from FIG. 19. The above vectors 504 and 509 are the characteristic amount indicative of a correlation (difference) between the numbers of zero bit planes of a code block of interest to be processed and one or more code blocks adjacent thereto, for example, as described above.

Figure 19:
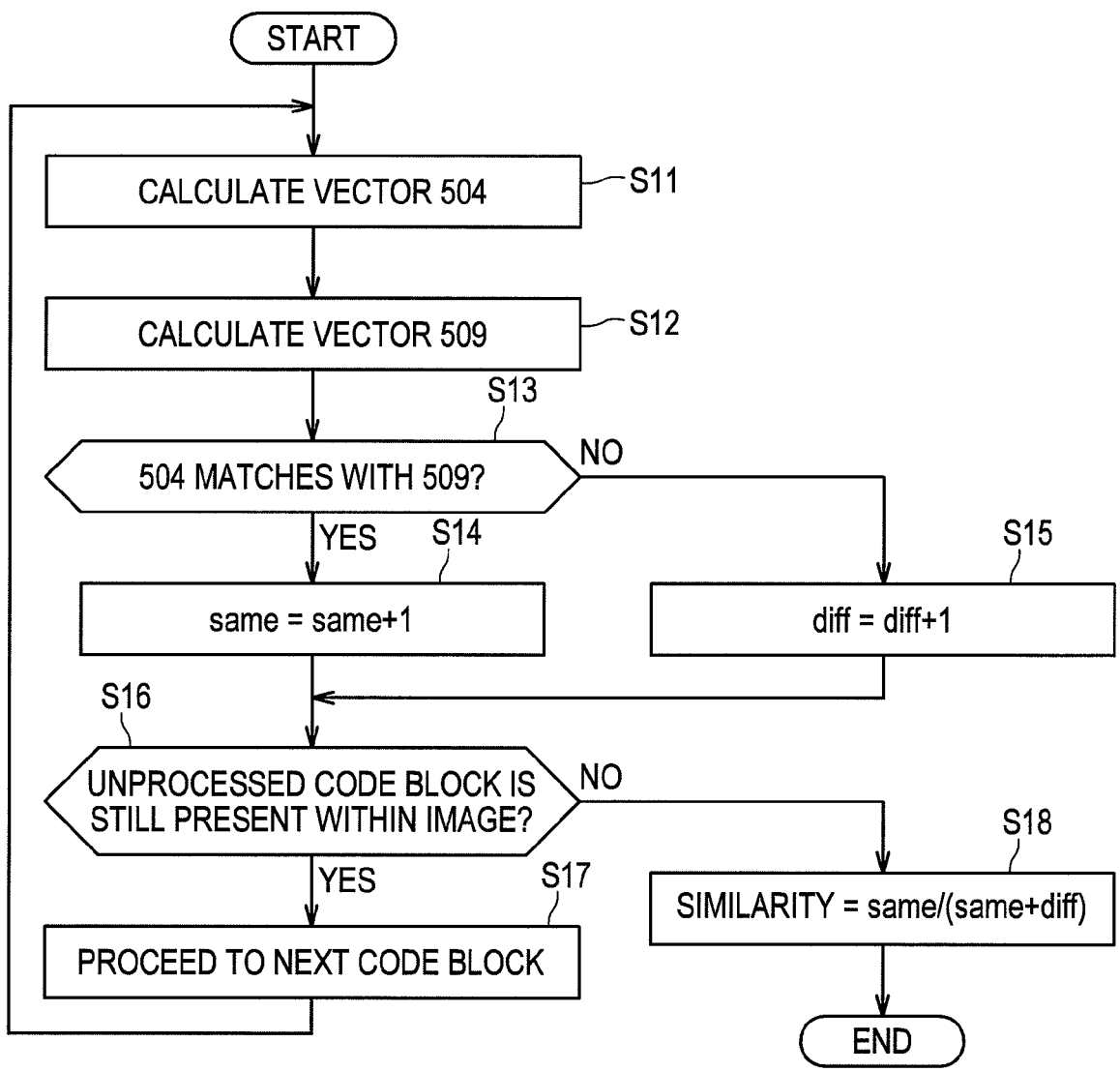
FIG. 19 is a flowchart for explaining operations of the image comparing apparatus according to the fifth embodiment of the present invention.

At first, in step S11 of FIG. 19, the vector calculating unit 22 of the code stream characteristic amount extracting unit 20 of FIG. 18 calculates and outputs the vector 504 for the code block of interest in the code stream 500.

In next step S12, the vector calculating unit 35 in the specific image characteristic amount output unit 30 (or 30A, 30B) outputs the vector 509 of the specific image at the same position as the code block of interest in the code stream.

In next step S13, the comparing unit 40C compares the vectors 504 and 509 to make a matching decision, and sends a decision result as the comparison output 511 of FIG. 18 to the accumulating unit 42. When it is decided that the vectors match with each other (YES) in step S13, the processing proceeds to step S14, and when it is decided that the vectors does not match with each other (NO), the processing proceeds to step S15. The operations in steps S14 and S15 are executed in the accumulating unit 42.

In step S14, a value of variable "same" indicating a degree of similarity is increased by 1 (same=same+1) in the accumulating unit 42 and the processing proceeds to step S16. In step S15, a value of variable "diff" indicating a degree of non-similarity is increased by 1 (diff=diff+1) in the accumulating unit 42 and the processing proceeds to step S16.

In step S16, a decision is made as to whether an unprocessed code block is still present within the image of the code stream, and if an unprocessed code block is present (YES), the processing proceeds to step S17. When an unprocessed code block is not present (NO), that is, when the comparison of the vectors for all the code blocks to be processed is finished, the processing proceeds to step S18, where the accumulating unit 42 calculates the similarity as described later.

In step S17, the processing proceeds to a subsequent unprocessed code block within the image of the code stream, where the code block is assumed as a new code block of interest, and then returns to step S11. In step S11, a vector of the updated code block of interest within the image of the code stream is calculated. Further, in step S12, a vector of the code block at the same position as the updated code block of interest within the specific image is calculated. Furthermore, the processings subsequent to step S13, which are similar to the above processings, are performed.

The decision in step S16 is NO when the comparison of the vectors for all the code blocks within the range to be processed is finished, and the accumulating unit 42 makes a calculation as shown in step S18, and outputs the similarity 520. The similarity is calculated from the equation of similarity=same/(same+diff).

In this manner, in the image comparing apparatus 1C according to the fifth embodiment of the present invention, the vectors are compared between the code blocks at the same position for the code stream and the specific image and the comparison result thereof is accumulated for all the code blocks. Thus, the similarity decision can be made for the code stream and the specific image. Also in this case, the number of zero bit planes is only extracted from the code stream and the code stream does not need to be completely decoded so that a highly accurate comparison can be made even if the quantization step size is different, which is remarkably advantageous for simple processing and processing speed.

The values of variables (same, diff) are increased by 1 when the numbers of zero bit planes are the same or different in the above explanation, but the values may be actually weighted. At this time, it is preferable to preferentially weight the characteristic parts of the image. For example, since a low-pass side is assumed to be characteristic in the case of a typical image, it is preferable to preferentially weight the comparison result of the low-pass side code blocks. It is preferable to preferentially weight the comparison result in the luminance component than the comparison result in the color component.

The similarity decision between the code stream and the specific image is made in the above explanation, but the similarity is finally compared with the threshold so that the matching decision can be made. Of course, if a deviation occurs between the value of variable "same" and the value of variable "diff", the matching decision can be made before the final processing.

9. Other Configuration Examples

Other Configuration Examples and Variants

The present invention is not limited to the first to fifth embodiments described above, and may be variously configured without departing from the scope of the present invention.

For example, the vector indicative of the correlation between the number of zero bit planes of the code block of interest and the number of zero bit planes of its neighboring code block employs the three cases of Case-1, Case-2 and Case-3 in FIGS. 11A to 11C, but is not limited thereto. In other words, in the examples shown in FIGS. 11A to 11C, the cases of one code block right-adjacent to the code block of interest, four code blocks upper-, lower-, right- and left-adjacent thereto, and eight code blocks upper-, lower-, right-, left- and oblique-adjacent thereto in eight directions are shown. Additionally, one code block left-adjacent to the code block of interest, one code block upper- or lower-adjacent thereto, two code blocks right- and left-adjacent thereto, two code blocks upper- and lower-adjacent thereto, and the like are assumed. Further, the difference relationship between the number of bit planes of the code block of interest and the number of bit planes of an adjacent code block is expressed by −1, 0, 1 as the vector element, but the difference value may be assumed as vector element.

There has been mainly described in the explanation of the embodiments the comparison of the vectors for all the code blocks within the image, but the comparison for all the code blocks does not need to be made necessarily. If the vector comparison processing for part of the code blocks is omitted, the decision result as matched easily occurs even if actually not matched. When the decision accuracy is enough in consideration of usage conditions, the processing for part of the code blocks is omitted so that the processing can be made faster in its speed and simplified. Actually, since the code blocks at the low-pass side in the luminance component are always decided to be not-matched from the experiment, an issue does not occur if a restriction such as only luminance component or other than high-pass side subbands is added. For example, there can be used the fact that many items of information concentrate on the low-pass component due to the characteristics of the wavelet conversion. In other words, the wavelet conversion is divided into three to form 10 subbands in the example of FIG. 13, but matching among four low-pass subbands (LL-3, HL-3, LH-3, HH-3) therefrom may be taken. In this case, the number of code blocks is remarkably smaller than in the entire screen so that the comparison calculating can be terminated at high speed while restricting a decrease in comparison accuracy.

The specific image is coded partway to extract the characteristic amount in the aforementioned embodiments, but the specific image is completely coded to generate a code stream and then the characteristic amount may be extracted from the code stream. For example, when a matching decision is made, the specific image may be compressed and coded according to JPEG 2000 system to generate a code stream, and the vector may be calculated as the characteristic amount from the code stream. Since the header part of the code stream obtained by coding the specific image stores therein the number of zero bit planes for each code block, and the like as described above, the vector indicative of a correlation between multiple adjacent code blocks can be easily calculated. The code stream characteristic amount extracting unit for the specific image is similar to the code stream characteristic amount extracting unit 20 according to the first to third embodiments. With the above configuration, two code stream characteristic amount extracting units having the same configuration and a typical coding unit have only to be arranged so that the design thereof is advantageously easy.

The image comparing apparatus 1, 1A, 1B similar to those in the first to third embodiments is used in the explanation of the fourth embodiment (FIG. 16), but the image comparing apparatus 1C according to the fifth embodiment (FIG. 18) may be used. In this case, the selecting unit 60 of FIG. 16 may be configured to output an index of a code stream whose similarity exceeds a certain threshold, for example.

A series of processings in the aforementioned embodiments may be performed in software. In this case, the programs configuring the software may be previously incorporated in computer dedicated hardware such as ROM (Read Only Memory) and hard disk. Further, the programs may be installed via a network or recording medium into a general purpose personal computer capable of executing various functions based on the installation of various programs. The recording medium can employ magnetic disks (containing flexible disk), optical disks (containing CD-ROM and DVD (Digital Versatile Disk)), magnetooptical disks, or package mediums such as semiconductor memory, for example.

The above embodiments have been described using JPEG 2000 system as image compressing system, but the present invention is not limited thereto and is applicable to other image compressing systems such as JPEG or MPEG (Moving Picture Experts Group).

In related art, when the same uncompressed image as the specific image is retrieved and identified from among multiple JPEG 2000 coded code streams stored in the database, the quantization step sizes need to be completely matched with each other due to a restriction of the JPEG 2000 coding standard. However, according to the embodiments of the present invention, a correlation value with the zero bit plane information of the surrounding code blocks is vectorized so that even if the quantization step sizes are different, the image can be identified with high accuracy. In this case, since the number of zero bit planes is only extracted from the code stream and the code stream is not completely decoded, it is advantageous that the processings such as MQ decoding, bit modeling, inverse quantizing and inverse wavelet converting are not required. Particularly, the MQ code does not need to be decoded for extracting the number of zero bit planes from the code stream and the comparison can be made with high accuracy even when the quantization step sizes are different, which is remarkably advantageous for simple processing and processing speed. The range of code blocks to be compared is limited within specific subbands so that the comparison processing time can be remarkably reduced.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-27381 filed in the Japan Patent Office on 9 Feb. 2009, the entire content of which is hereby incorporated by reference.

The applicable fields of the embodiments of the present invention may include database for digital cinema, archive systems, image database in broadcast station, recording systems for medical images, network servers, non-linear editing apparatuses, game devices, authoring tools on PC or its software modules.

What is claimed is:

1. An image comparing apparatus for comparing a code stream obtained by coding an image with a specific image to decide whether to match, comprising:
   a vector calculating device calculating a first vector indicative of a correlation between the number of zero bit planes of a code block of interest to be processed and the number of zero bit planes of a code block near the code block of interest based on the number of zero bit planes of the code stream;
   a vector output device outputting a second vector indicative of a correlation between the number of zero bit planes of a code block of interest in the specific image and the number of zero bit planes of a code block near the code block of interest, wherein the vector output device outputs the second vector calculated based on the number of zero bit planes for each code block obtained when coding the specific image using coding parameters not containing a quantization step size among the coding parameters used when coding the code stream; and
   a comparing device sequentially comparing a first vector from the vector calculating device with a second vector from the vector output device for code blocks of interest at the same position of the code stream and the specific image and deciding whether the code stream matches with the specific image depending on a comparison result.

2. The image comparing apparatus according to claim 1, wherein the first and second vectors express a difference between the number of zero bit planes of the code block of interest and the numbers of zero bit planes of one or more code blocks among eight surrounding code blocks adjacent to the code block, of interest.

3. The image comparing apparatus according to claim 2, wherein the comparing device compares a first vector of a code block of interest from the vector calculating device with a second vector of a code block at the same position as the code block of interest from the vector output device, and if the number of matched code blocks is equal to or more than a preset threshold, decides that the code stream matches with the specific image.

4. The image comparing apparatus according to claim 3, wherein the comparing device decides, when the first vector matches with the second vector for all the code blocks within each image in the code stream and the specific image, that the code stream matches with the specific image.

5. The image comparing apparatus according to claim 3, wherein the comparing device compares the first vector with the second vector only for part of components or part of subbands in the code stream and the specific image.

6. The image comparing apparatus according to claim 1, comprising a code stream analyzing device analyzing the code stream and thereby extracting the number of zero bit planes for each code block from the code stream,
   wherein the vector calculating device calculates the first vector based on the number of zero bit planes extracted by the code stream analyzing device.

7. The image comparing apparatus according to claim 1, comprising a coding parameter extracting device for extracting coding parameters from the code stream,
   wherein the vector output device has a specific image vector calculating device for calculating the second vector based on the number of zero bit planes for each code block obtained when coding the specific image using coding parameters not containing a quantization step size among the coding parameters extracted by the code parameter extracting device.

8. The image comparing apparatus according to claim 1, wherein the code stream is obtained by compressing and coding the image according to JPEG 2000 system,
   the coding parameters contain wavelet converting filter information, wavelet conversion's decomposition level number, quantization step size, code block size, guard bit information and target compression rate, and
   the vector output device outputs the second vector calculated based on the number of zero bit planes for each code block obtained when coding the specific image according to JPEG 2000 system using coding parameters not containing a quantization step size among the coding parameters used when coding the code stream.

9. An image comparing method for comparing a code streams obtained by coding an image with a specific image to decide whether to match, comprising the steps of:
   analyzing the code stream and thereby extracting the number of zero bit planes for each code block from the code stream;
   calculating a first vector indicative of a correlation between the number of zero bit planes of a code block of interest to be processed and the number of zero bit planes of a code block near the code block of interest based on the number of zero bit planes extracted in the code stream analyzing step;
   outputting a second vector indicative of a correlation between the number of zero bit planes of a code block of interest and the number of zero bit planes of a code block near the code block of interest for the specific image, wherein the vector outputting step outputs the second vector calculated based on the number of zero bit planes for each code block obtained when coding the specific image using coding parameters not containing a quantization step size among the coding parameters used when coding the code stream; and
   sequentially comparing a first vector from the vector calculating step with a second vector from the vector outputting step for code blocks of interest at the same position of the code stream and the specific image and deciding whether the code stream matches with the specific image depending on a comparison result.

10. A program embodied on a non-transitory computer readable medium for causing a computer to execute a processing of comparing a code stream obtained by coding an image with a specific image and deciding whether to match, the program for causing a computer to execute:
   a code stream analyzing procedure of analyzing the code stream and extracting the number of zero bit planes for each code block from the code stream;
   a vector calculating procedure of calculating a first vector indicative of a correlation between the number of zero bit planes of a code block of interest to be processed and the number of zero bit planes of a code block near the code block of interest based on the number of zero bit planes extracted in the code stream analyzing procedure;
   a vector outputting procedure of outputting a second vector indicative of a correlation between the number of zero bit planes of a code block of interest and the number of zero bit planes of a code block near the code block of interest for the specific image, wherein the vector outputting procedure outputs the second vector calculated based on the number of zero bit planes for each code block obtained when coding the specific image using coding parameters not containing a quantization step size among the coding parameters used when coding the code stream; and a comparing procedure of sequentially comparing a first vector from the vector calculating procedure with a second vector from the vector outputting procedure for code blocks of interest at the same position of the code stream and the specific image and deciding whether the code stream matches with the specific image depending on a comparison result.

11. A non-transitory recording medium recording therein a program for causing a computer to execute a processing of comparing a code stream obtained by coding an image with a specific image to decide whether to match, the program causing a computer to execute:

a code stream analyzing procedure of analyzing the code stream and thereby extracting the number of zero bit planes for each code block from the code stream;

a vector calculating procedure of calculating a first vector indicative of a correlation between the number of zero bit planes of a code block of interest to be processed and the number of zero bit planes of a code block near the code block of interest based on the number of zero bit planes extracted in the code stream analyzing procedure;

a vector outputting procedure of outputting a second vector indicative of a correlation between the number of zero bit planes of a code block of interest and the number of zero bit planes of a code block near the code block of interest for the specific image, wherein the vector outputting procedure outputs the second vector calculated based on the number of zero bit planes for each code block obtained when coding the specific image using coding parameters not containing quantization step size among the coding parameters used when coding the code stream; and a comparing procedure of sequentially comparing a first vector from the vector calculating procedure with a second vector from the vector outputting procedure for code blocks of interest at the same position of the code stream and the specific image and deciding whether the code stream matches with the specific image depending on a comparison result.

12. An image comparing apparatus for comparing a code stream obtained by coding an image with a specific image to decide whether to match, comprising:

a vector calculating means for calculating a first vector indicative of a correlation between the number of zero bit planes of a code block of interest to be processed and the number of zero bit planes of a code block near the code block of interest based on the number of zero bit planes of the code stream;

a vector output means for outputting a second vector indicative of a correlation between the number of zero bit planes of a code block of interest in the specific image and the number of zero bit planes of a code block near the code block of interest, wherein the vector output means outputs the second vector calculated based on the number of zero bit planes for each code block obtained when coding the specific image using coding parameters not containing a quantization step size among the coding parameters used when coding the code stream; and a comparing means for sequentially comparing a first vector from the vector calculating means with a second vector from the vector output means for code blocks of interest at the same position of the code stream and the specific image and deciding whether the code stream matches with the specific image depending on a comparison result.

* * * * *